US012120270B2

(12) United States Patent
Skinner et al.

(10) Patent No.: US 12,120,270 B2
(45) Date of Patent: *Oct. 15, 2024

(54) MONITORING REPRESENTATIVES IN A CONTACT CENTER ENVIRONMENT

(71) Applicant: State Farm Mutual Automobile Insurance Company, Bloomington, IL (US)

(72) Inventors: Chad Skinner, Talladega, AL (US);
Rachel Duffield, Bloomington, IL (US);
Aaron Kammeyer, Clinton, IL (US);
Amit Gupta, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,086

(22) Filed: Jun. 7, 2023

(65) Prior Publication Data

US 2023/0319188 A1 Oct. 5, 2023

Related U.S. Application Data

(63) Continuation of application No. 17/545,736, filed on Dec. 8, 2021, now Pat. No. 11,706,344.
(Continued)

(51) Int. Cl.
*H04M 3/00* (2024.01)
*H04M 3/51* (2006.01)
*H04M 3/523* (2006.01)

(52) U.S. Cl.
CPC ....... *H04M 3/5232* (2013.01); *H04M 3/5175* (2013.01)

(58) Field of Classification Search
CPC .......................... H04M 3/5232; H04M 3/5175
(Continued)

(56) References Cited

U.S. PATENT DOCUMENTS 6,243,763 B1 6/2001 Brodsky et al.
6,263,066 B1 7/2001 Shtivelman et al.
(Continued)

FOREIGN PATENT DOCUMENTS

EP 1163564 12/2001

OTHER PUBLICATIONS

Bozdag, et al., "A Comparison of Push and Pull Techniques for AJAX", 2007 9th IEEE International Workshop on Web Site Evolution, doi: 10.1109/WSE.2007.438.0239, 2007, pp. 15-22.
(Continued)

*Primary Examiner* — William J Deane, Jr.
(74) *Attorney, Agent, or Firm* — Lee & Hayes, P.C.

(57) ABSTRACT

Techniques described herein relate to representative monitoring in a contact center environment. Data associated with a customer interaction, including content of the interaction and video of a representative display during processing associated with the interaction, are presented to an administrator in real time or near real time for monitoring during an interaction. In some examples, a contact center server may receive an event notification when a live contact begins, and may generate data files associated with the live contact to allow the administrator to monitor the contact. In some instances, the contact center server may continue to generate data after conclusion of the live contact, to allow the administrator to monitor and guide post-contact processing performed by the representative. The contact center server also may allow administrators to select live contacts for monitoring and/or receive alerts when pre-selected representatives commence live contacts that can be monitored.

20 Claims, 7 Drawing Sheets

Related U.S. Application Data

(60) Provisional application No. 63/122,652, filed on Dec. 8, 2020.

(58) Field of Classification Search
USPC .................................. 379/265.01–266.1, 309
See application file for complete search history.

(56) References Cited

U.S. PATENT DOCUMENTS

| | | | |
|---|---|---|---|
| 6,301,246 B1 * | 10/2001 | Shaffer | H04L 63/304 379/32.01 |
| 6,621,895 B1 | 9/2003 | Giese | |
| 6,771,766 B1 | 8/2004 | Shafiee et al. | |
| 6,775,377 B2 | 8/2004 | McIllwaine et al. | |
| 6,904,143 B1 | 6/2005 | Peterson et al. | |
| 7,072,966 B1 | 7/2006 | Benjamin et al. | |
| 7,092,509 B1 | 8/2006 | Mears et al. | |
| 7,233,980 B1 | 6/2007 | Holden et al. | |
| 7,315,616 B2 | 1/2008 | Annadata et al. | |
| 7,353,253 B1 | 4/2008 | Zhao | |
| 7,505,577 B2 | 3/2009 | Annadata et al. | |
| 7,730,204 B2 | 6/2010 | Pak | |
| 7,788,679 B2 | 8/2010 | Chen et al. | |
| 7,805,487 B1 | 9/2010 | Isaacs et al. | |
| 7,922,493 B1 | 4/2011 | Gennaro et al. | |
| 7,965,995 B2 | 6/2011 | Spector | |
| 8,001,186 B2 | 8/2011 | Kordun | |
| 8,112,391 B2 | 2/2012 | Allen et al. | |
| 8,271,618 B1 | 9/2012 | Kridlo | |
| 8,379,832 B1 | 2/2013 | Lyman | |
| 8,396,205 B1 | 3/2013 | Lowry et al. | |
| 8,806,024 B1 | 8/2014 | Toba Francis et al. | |
| 9,077,804 B2 | 7/2015 | Kannan et al. | |
| 9,106,736 B1 | 8/2015 | Slovacek | |
| 9,172,806 B2 | 10/2015 | Tuchman et al. | |
| RE45,959 E | 3/2016 | McCord et al. | |
| 9,338,121 B2 | 5/2016 | Ciancio-Bunch | |
| 9,356,896 B2 | 5/2016 | Jesse et al. | |
| 9,515,976 B2 | 12/2016 | Talwar et al. | |
| 9,521,259 B2 | 12/2016 | Davis et al. | |
| 9,569,751 B2 | 2/2017 | Steiner et al. | |
| 9,807,040 B2 | 10/2017 | Mendiola et al. | |
| 9,826,095 B2 | 11/2017 | D'Arcy et al. | |
| 9,843,681 B2 | 12/2017 | Tuchman et al. | |
| 9,930,179 B2 | 3/2018 | Steiner et al. | |
| 9,984,061 B2 | 5/2018 | Isensee et al. | |
| 10,275,448 B2 | 4/2019 | Isensee et al. | |
| 10,320,971 B2 | 6/2019 | Ghull et al. | |
| 10,346,785 B2 | 7/2019 | Tamblyn et al. | |
| 10,601,991 B1 | 3/2020 | Braddick | |
| 10,601,992 B2 | 3/2020 | Dwyer et al. | |
| 10,671,337 B2 | 6/2020 | Khalatian et al. | |
| 10,671,977 B2 | 6/2020 | Caldwell et al. | |
| 10,693,923 B2 | 6/2020 | Abiezzi | |
| 10,694,040 B1 | 6/2020 | Jiron et al. | |
| 10,997,557 B2 | 5/2021 | Frank et al. | |
| 11,423,448 B2 | 8/2022 | Udupa et al. | |
| 2003/0033369 A1 | 2/2003 | Bernhard | |
| 2003/0078985 A1 | 4/2003 | Holbrook et al. | |
| 2003/0097361 A1 | 5/2003 | Huang et al. | |
| 2004/0024794 A1 | 2/2004 | Jain et al. | |
| 2004/0243617 A1 | 12/2004 | Bayyapu | |
| 2005/0053018 A1 | 3/2005 | Hoppe-Boeken et al. | |
| 2006/0126817 A1 * | 6/2006 | Beckett | H04M 3/5175 379/265.06 |
| 2006/0256954 A1 | 11/2006 | Patel et al. | |
| 2007/0198284 A1 | 8/2007 | Korenblit et al. | |
| 2007/0203797 A1 | 8/2007 | Annadata et al. | |
| 2008/0240404 A1 | 10/2008 | Conway et al. | |
| 2009/0035736 A1 | 2/2009 | Wolpert et al. | |
| 2011/0223574 A1 | 9/2011 | Crawford et al. | |
| 2012/0030298 A1 | 2/2012 | Bells et al. | |
| 2013/0039483 A1 | 2/2013 | Wolfeld et al. | |
| 2013/0086153 A1 | 4/2013 | Vendrow | |
| 2013/0176413 A1 | 7/2013 | Lowry et al. | |
| 2013/0218922 A1 | 8/2013 | DeLuca et al. | |
| 2015/0180845 A1 | 6/2015 | Uomini | |
| 2018/0083898 A1 | 8/2018 | Pham | |
| 2020/0099790 A1 | 3/2020 | Ma et al. | |
| 2020/0111377 A1 | 4/2020 | Truong et al. | |
| 2020/0364724 A1 | 11/2020 | Pulugurtha et al. | |
| 2020/0394590 A1 | 12/2020 | Kaimal et al. | |
| 2022/0086279 A1 | 3/2022 | Skinner et al. | |
| 2022/0182492 A1 | 6/2022 | Skinner et al. | |
| 2023/0362260 A1 | 11/2023 | Skinner | |

OTHER PUBLICATIONS

Office Action for U.S. Appl. No. 17/378,204, mailed on May 11, 2022, Skinner, "Contact Center Messaging", 12 pages.

Office Action for U.S. Appl. No. 17/378,204, mailed on Sep. 15, 2022, Skinner, "Contact Center Messaging", 13 Pages.

Office Action for U.S. Appl. No. 17/477,269, mailed on Oct. 16, 2023, Chad Skinner, "Integrated Representative Profile Data in Contact Center Environment", 11 pages.

Bozdag, et al., "A Comparision of Push and Pull Techniques for AJAX", 2007 9th IEEE International Workshop on Web Site Evolution, doi: 10.1109/WVSE.2007.438.0239, 2007, pp. 15-22.

* cited by examiner

MONITORING REPRESENTATIVES IN A CONTACT CENTER ENVIRONMENT

RELATED APPLICATIONS

This application claims priority to and is a continuation of co-pending U.S. patent application Ser. No. 17/545,736, filed Dec. 8, 2021, and entitled "MONITORING REPRESENTATIVES IN A CONTACT CENTER ENVIRONMENT", which claims priority to and is a non-provisional of U.S. Patent Application No. 63/122,652, filed Dec. 8, 2020, and entitled "MONITORING REPRESENTATIVES IN A CONTACT CENTER ENVIRONMENT," the disclosures of which are incorporated by reference herein in its entirety for all purposes.

BACKGROUND

Large organizations often use automated contact centers to handle interactions between employees or representatives of the organization and customers or other parties. Different types of organizations, including businesses, government agencies, and educational institutions may use automated contact centers for sales, customer service, technical and software support, problem resolution, or the like. Automated contact centers may be small or large-scale, depending on the amount of customer traffic and the structure of the organization. Large-scale contact centers, for example, may include representatives in different roles and/or different departments, using client systems that are distributed across different data centers, geographic locations, and/or networks. In some cases, a customer call or other contact (e.g., video or chat session) into the contact center may be answered first by an automated computer system which requests a series of inputs from the customer to determine where the contact is to be routed.

The various hardware, network, and software components of a contact center may collaborate to support interactive communication sessions between customers and organization representatives, each operating independently on the separate computing devices. Different contact center environments may support different combinations of interactive communication session types and/or media types, including voice sessions (e.g., telephony-based), video chat sessions, email communications, social media-based sessions, etc. Some contact centers support targeted routing of contacts to different queues and/or specific representatives based on customer or contact attributes (e.g., media type, geographic location, language, etc.) as well as the customer's responses to automated phone menus, voice response units, conversation bots, and the like. Additionally, some contact centers use automated tools to assist representatives in managing the interaction with the customer during a live contact, such as automated prompting of cross-selling or upselling opportunities, on-the-fly sentiment analysis tools, escalation guidelines, etc.

While contact centers may provide for enhanced customer service, e.g., by routing contacts more effectively and/or by providing information to representatives for managing a customer interaction, the representative, e.g., her aptitude, proficiency, demeanor, or the like, may be the deciding factor of whether a contact is successful from a customer perspective. Accordingly, it is important that representatives be trained or coached to interact with customers. Conventionally, representatives may be provided with process flows for handling customer contacts. Such flows may be presented during a call, e.g. on a display, or may be provided as hard copies. In some scenarios, a manager or administrator may sit next to a representative-in-training to oversee the representative and/or provide direction during an interaction. Once a representative is trained, the administrator or manager may perform small sample checks to ensure proper adherence to protocols. These conventional systems and processes require the administrator or manager to be physically present with the representative, e.g., on a calling floor, sharing an audio feed, or the like.

These conventional training and coaching techniques are deficient in many ways. For instance, requiring the administrator and representative to be physically present at the same location unnecessarily restricts the location of both the representative and the administrator. Moreover, administrators are often tasked with training and overseeing large numbers of representatives, e.g., dozens, hundreds, or more. This volume of representatives makes it difficult or impossible to ensure that all representatives are receiving the necessary coaching and training as they progress through their careers. Moreover, conventional systems do not allow for an administrator to selectively monitor live contacts, e.g., based on a sentiment of the customer, or to actively assist a representative during a contact.

SUMMARY

To address problems and inefficiencies associated with conventional training and coaching systems in a contact center environment, this disclosure describes various systems and techniques for providing an improved environment and improved data processing techniques. In some examples, a contact center server receives an event notification when a live contact, e.g., between a representative and a customer, begins. The contact center server generates a data file associated with the live contact including multimedia associated with the contact, e.g., audio, video, text, as well as video of a display associated with the representative. On request by an administrator, the data file may be transferred to the administrator, e.g., so the administrator can monitor the contact, using the multimedia associated with the contact, and monitor the actions of the representative, using the video of the representative's display. The data file may be presented to the administrator in real-time or near-real time. The contact center server may include further functionality that allows the administrator to interact with the representative, e.g., via a message or the like, during the contact. Alternatively, the data file may be accessible at other times, including after conclusion of the live contact. In some instances, the contact center server may continue to generate the data file even after conclusion of the live contact, e.g., by continuing to record data of the representative's display. In this manner, the administrator may also have insight into post-contact processing performed by the representative. Also in examples, the contact center server may allow administrators to select live contacts for monitoring and/or receive alerts when pre-selected representatives commence a live contact that can be monitored. Accordingly, systems and techniques described herein can provide improved coaching and training of representatives, more efficiently resolve customer queries, and/or improve functioning of contact centers.

In an example of the present disclosure, a contact center server includes one or more processors; and one or more non-transitory computer-readable media storing computer-executable instructions that, when executed, cause the one or more processors to perform operations comprising: receiving an event notification associated with a live contact between a representative computing device and a customer computing device; causing display of a first user interface on a first display of an administrator computing device, the first user interface including a first indication of the live contact and a second indication of the representative computing device; receiving, via the first user interface, an administrator request to monitor the live contact; and causing, in response to the administrator request and at the administrator computing device, (i) display of a second user interface on the first display, the second user interface including video corresponding to a second display of the representative computing device, and (ii) presentation of audio associated with the live contact.

In another example of the present disclosure, a method includes receiving, from a first computing device, an event notification, the event notification indicating commencement of a live contact between the first computing device and a remote computing device; causing, at least in part in response to the event notification, presentation of a first user interface at a second computing device, the first user interface including an indication of the live contact; receiving, from the second computing device and in response to a user input received via the first user interface, a request to monitor the live contact; and causing, at the second computing device and based at least in part on the request, (i) presentation of data associated with the live contact and (ii) display of video corresponding to a display of the first computing device In yet another example of the present disclosure, one or more non-transitory computer-readable media store instructions that, when executed by one or more processors, cause the one or more processors to perform actions comprising: causing a live contact to commence between a representative computing device and a remote computing device; receiving an event notification, the event notification indicating commencement of the live contact; causing, at least in part in response to the event notification, presentation of a first user interface at an administrator computing device, the first user interface including an indication of the live contact; receiving, from the administrator computing device and in response to a user input received via the first user interface, a request to monitor the live contact; and causing, based at least in part on the request and at the administrator computing device, (i) presentation of data associated with the live contact and (ii) display of video corresponding to a display of the representative computing device.

DETAILED DESCRIPTION

Figure 1:
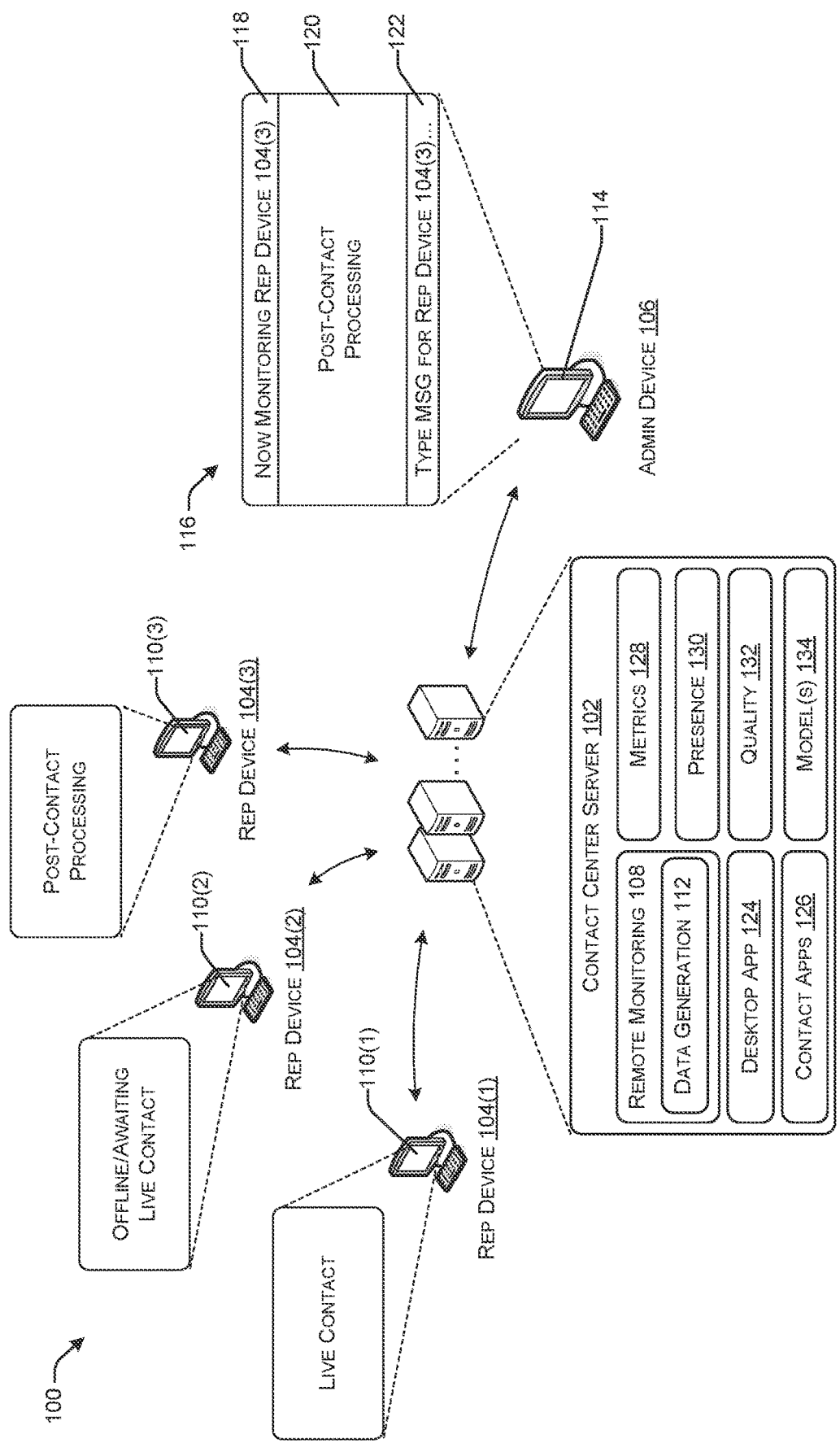
FIG. 1 is a schematic illustration of a computing environment associated with an automated contact center and illustrates an example of communication and data generation for a contact center server, an administrator device, and a representative device, in accordance with one or more examples of the present disclosure.

FIG. 1 illustrates an example of data and information generation and transmission in a contact center environment 100 according to aspects of this disclosure. For instance, the contact center environment 100 may schematically represent aspects of a business- or enterprise-wide contact center configured to accept, route, and dispose of customer inquiries. As illustrated in more detail in FIG. 1, the contact center environment 100 includes a contact center server 102 in communication with a first representative device 104(1), a second representative device 104(2), and a third representative device 104(3) (herein, collectively referred to, along with other representative devices not illustrated, as the representative devices 104) and an administrator device 106. A first user, e.g., a human representative of the business or enterprise, may be associated with one of the representative devices 104 and a second user, e.g., a human administrator or manager of the business or enterprise, may be associated with the administrator device 106. Although FIG. 1 illustrates three representative devices 104 and only a single administrator device 104, this is for example only. In some implementations, the environment 100 can include up to and thousands of representative devices and/or administrative devices.

As detailed further herein, the contact center server 102 includes functionality for improved monitoring of the representative devices 104, e.g., via the administrator device 106. For instance, in the illustrated embodiment, the contact center server 102 includes a remote monitoring component 108 to facilitate this functionality. In examples, the remote monitoring component 108 generates and stores data associated with contacts, e.g., live, customer contacts, facilitated via the representative devices 104, and enables access to that data at other devices, including the administrative device 106.

FIG. 1 illustrates a more detailed example of the processing performed by the contact center server 102, e.g., using the remote monitoring component 108. In the example, the first representative device 104(1) includes a first representative display 110(1), the second representative device 104(2) includes a second representative display 110(2), and the third representative device 104(3) includes a third representative display 110(3). Herein, the first representative display 110(1), the second representative display 110(2), and the third representative display 110(3), may be referred to herein as "the representative displays 110."

The first representative display 110(1) corresponds to the first representative device 104(1) being engaged in a live contact. In examples, the first representative display 110(1) may provide a representative interacting with the first representative device 104(1) with details associated with the contact. Without limitation, these details can include information about the customer with whom the contact is established, a history associated with the customer, product information that is the subject of the contact, prompts or suggestions for resolving the contact, or the like. In some examples, the first representative display 110(1) may facilitate user interaction of information relative to the contact. For instance, the display 110(1) may include a graphical user interface via which the representative can add, modify or delete information associated with the contact, search for information relevant to the contact, perform other contact processing, or the like. In at least some examples, the display may supplement or enable the contact. For example, a text- or chat-based contact may be carried out via interaction with a graphical user interface on the first display 104(1).

The second representative display 110(2) indicates that a live contact is not active on the second representative device 104(2). In this example, the representative associated with the second representative may be offline, e.g., away from the second representative device 104(2), on a break, performing activities not associated with a live contact, or the like. In examples, the second representative display 110(2) may have a blank screen, show a home screen, show a log-in screen, or have some other presentation.

The third representative display 110(3) corresponds to post-contact processing. For example, the representative associated with the third representative device 104(3) may have recently completed a live contact, e.g., by a customer hanging up, ending a chat or text session, or the like, and the representative may be making a record of the contact, updating customer information, and/or performing other processes associated with the concluded contact. The example representative displays 110 are for illustrative purposes, to show different states of the representative devices 104 and describe processes that may be occurring in connection with those states.

The remote monitoring component 108 includes a data generation component 112. In examples, the data generation component 112 is configured to generate interaction data corresponding to interactions at the representative client devices 104. For instance, the interaction data may be a video recording, an audio recording, a transcript or other text-based recording, or other representation of tasks performed by the representative(s) using the representative client devices 104. Tasks performed at the representative client devices 104 can include interactive contact sessions with customers, e.g., via the contact application 126, and the interaction data can be a record of such sessions. In examples, the interaction data also includes data associated with tasks or interactions of only the representative. Such data can include screen captures, screen recordings, recordings of representative inputs at the representative client device 104 (e.g., keystrokes or touch patterns), chat logs, dialog recordings, or the like. In at least some examples, the interaction data generation component 112 can generate different types of interaction data, e.g., depending on the contact application 126 or the interactivity type supported by the contact application 126. In other examples, however, the interaction data generation component 112 can generate a limited number of outputs, e.g., a single data-type. For instance, the interaction data generation component 112 may output only text data and may perform speech-to-text or similar processing to generate text from other data types.

In more detail, and with reference to the example of FIG. 1, for the live contact occurring at the first representative device 104(1), the data generation component 112 may generate a data file including the multimedia associated with the contact, e.g., audio of a voice-based interaction, images or video of messaging-based contacts, or the like, and video associated with the first representative display 110(1). In examples, the data generation component 112 can generate the data file including both the multimedia and the video corresponding to the display and store the data file together with an identifier associated with the live contact. Similarly, the data generation component 112 can generate a data file for the live contact that was just concluded at the third representative device 104(3). In the example of FIG. 1, this second data file may already include multimedia associated with the concluded contact, but may continue to be generated to include video of the third display 110(3), e.g., until the post-contact processing is completed. Although the data generation component 112 is illustrated as residing at the contact center server 102, some or all of the functionality associated with the data generation component can be generated at the representative devices 104, by contact applications 126 (described further below), or at or by other computing devices associated with the contact center environment 100.

The remote monitoring component 108 can also cause the data generated by the data generation component 112 to be presented to one or more additional computing devices. In the example of FIG. 1, the administrator device 106 receives data that enables the administrator device 106 to monitor the third representative device 104(3). More specifically, FIG. 1 illustrates that a display 114 of the administrator device 106 displays a graphical user interface 116 presenting various data and enabling various interactions at the administrator device 106. The graphical user interface 116 and functionality associated therewith is detailed herein, but the illustrated graphical user interface 116 and/or the described functionality are for example only; other graphical user interfaces and/or other interfaces may be used in other examples.

In examples described herein, the administrator device 106 is used to monitor representatives using the representative devices 104. In the example of FIG. 1, the administrator device 106 is used to monitor the third representative device 104(3), and the graphical user interface 116 includes a visual indicator 118 that the user of the administrator device 106 is "now monitoring representative device 104 (3)." While the visual indicator 118 is indicated as including specific text proximate a top of the graphical user interface 116, this is for example only. In other examples, the visual indicator 118 may include any graphical, textual, or other visual representation at any position of the graphical user interface 116. Without limitation, the visual indicator 118 can include an identification of the representative associated with the monitored device, a location of the device, specifics of the contact, and/or the like. Also in some examples the visual indicator 118 may not be included at all.

The graphical user interface 116 presented on the display 114 also includes a monitoring section 120 or monitoring window. The monitoring section 120 provides playback of video data corresponding to the display of the monitored device. In the example of FIG. 1, the monitoring section 120 displays the same content displayed on the third display 110(3) associated with the third representative device 104 (3). In examples, the remote monitoring component 108 can include a mirror of the third display 110(3), e.g., such that the remote monitoring component 108 is displaying the third display 110(3) in real-time or near real-time. Accordingly, in examples, the monitoring section 120 allows the administrator associated with the administrator device 106 to see applications open or active on the third representative device 104(3), as well as representative interactions with those applications, such as cursor movements, text- or data-entries, icon selections, and/or the like.

In the example of FIG. 1, and as discussed above, the monitored device, e.g., the third representative device 104(3), has finished interacting with a customer or other remote device, but is performing tasks associated with the interaction or live contact. Because the interaction is completed, the administrator device 106 does not receive data corresponding to the interaction. Such data can include multimedia data, e.g., audio data associated with a phone- or VoIP-based conversation, textual data corresponding to a messaging-based contact, video data associated with a video conference, or the like. In contrast, if the interaction was still live, the interaction may also be presented to the administrator via the administrator device 106. For instance, audio associated with the interaction may be played via speakers or other audio output, video or other image data associated with the interaction may be displayed via the graphical user interface 116, e.g., as a section or window separate from the remote monitoring component 108. In still other examples, when the contact is text-based, messaging-based, or the like, the interaction may be visible in the video of the third representative display 110(3), e.g., in the remote monitoring component 108.

The graphical user interface 116 can also enable other functionality. For instance, the graphical user interface 116 includes a messaging section 122, indicated with the text "Type MSG for rep device 104(3)." In this implementation, the administrator associated with the administrator device 106 can type or otherwise enter text, graphics, or the like, into the messaging section 122, and such messages may be presented to the representative associated with the third representative device 104(3), e.g., on the third representative display 110(3). In the example of FIG. 1, the administrator may, via messages entered into the messaging section 122, coach or otherwise instruct the representative associated with the third representative device 110(3) regarding completing the post-contact processing being performed. Were the administrator device 106 monitoring a live contact, the administrator may coach or otherwise assist a representative to resolve the on-going contact via the messaging section 122. In some examples, the contact center server 102 may enable socket-level communication between devices, e.g., the representative devices 104 and/or the administrator device 106 to allow for transmission of messages generated according to examples described herein. In other examples, message functionality may not be provided and/or messaging functionality may be otherwise enabled.

In the example of FIG. 1, the administrator device 106 receives information to monitor the third representative device 104(3) in real time or near-real time. However, in other examples, the data generation component 112 can generate data, e.g., separate data files, for individual contacts. The data can include the multimedia associated with the contact and the video associated with the corresponding representative display, as detailed herein. The data may be stored and accessible on-demand, e.g., such that the administrator or other manager can review contacts and processing associated with those contacts after the contacts are concluded. For instance, the data files may be stored together with a hash including information about one or more of the representative, the representative device, the type of contact (e.g., voice, text, etc.), an identity of the customer, a subject of the contact, and/or any other data associated with the contact(s). Also in examples, the data generation component 112 can include functionality to generate additional data. For instance, when the contact is a voice-based contact, the data generation component 112 can perform speech-to-text processing, e.g., to generate a transcript of the voice-based interaction. In examples, the transcript can be stored as part of the data file described above and/or may be presented to the administrator, either together with or instead of the audio associated with the contact.

The contact center server 102 includes the remote monitoring component 108 that performs data generation and generally coordinates data transfer between and among the representative devices 104 and the administrator device 106 to facilitate remote monitoring, as described herein. The contact center server 102 may also perform other operations in the contact center environment 100. For example, and as illustrated in FIG. 1, the contact center server 102 may also host a desktop application 124 and a plurality of contact applications 126. As detailed further herein, a contact center implementing the contact center server 102 may provide a centralized hub or software architecture for many diverse segments of a business or organization. That is, the contact center server 102 may host a number of different applications, including the remote monitoring component 108, accessible by administrators, e.g., via the administrator device 106, by representatives, e.g., via the representative devices 104, and by customers (not shown in FIG. 1). The contact center may have an overarching framework, embodied at least in part in the desktop application 124. In some examples, aspects of the desktop application 124 may be accessed by the representative devices 104 to access all other applications, including the contact applications 126. In other examples, the desktop application 124 may be at least partially stored on the administrator device 106 and/or the representative devices 104. Although FIG. 1 illustrates the remote monitoring component 108 as separate from the desktop application 124, in other examples all or a portion of the remote monitoring component 108 may be integrated into or otherwise associated with the desktop application 124.

The contact applications 126 are applications accessed and used by the representative devices 104. The representative devices 104 can be thick client devices that access the contact applications 126 and/or download an instance of the contact applications 126 to perform actions, such as engage in live contacts, associated with the contact center server 102. In some examples, the contact applications 126 may be containerized applications accessible via images maintained at the contact center server 102. The contact applications 126 are run, e.g., by receiving, unpacking, and execution, on the individual representative devices 104 to perform contact-related services. In some instances, the contact applications 126 are third-party software applications that facilitate one or more specific contact interactions. For instance, a first of the contact applications 126 may allow a representative using one of the representative devices 104 to have a text-based conversation with a customer accessing the contact center via a "chat" function, e.g., available on a website or application. A second of the contact applications 126 may allow a representative using one of the representative devices 104 to have a voice-based conversation with a customer accessing the contact center server 102, e.g., via a phone or other speech-based interface.

Techniques including using containerized application images as the contact application 126 may improve the functioning the contact center environment 100 by providing applications (or sub-processes therein) that are device specific and/or user specific to client devices, such as the administrator device 106 and/or the representative devices 104. Additional technical advantages of such features within contact center environments may result from more efficient and streamlined software updates and modifications. For instance, when an organization is required to modify or reconfigure a thick client application, if the thick client application is installed on each separate client device then a software update or patch may be transmitted to all client devices associated with the contact center. These decentralized software updates may be uncoordinated, unreliable, and inefficient. In contrast, distributing containerized application images from a repository stored in the contact center server(s) 102 of the contact center may improve performance and distribution of software updates within the contact center.

The representative devices 104 run instances of the desktop application 124. For instance, the desktop application 124 may be run on each of the representative devices 104 upon a representative logging into the representative devices 104. The representative devices 104 also run instances of the contact applications 126. For instance, in implementations, user interfaces on the representative displays 110 are substantially the same across each of the representative devices 104. For instance, each of the user interfaces may provide similar functionality, including functionality to access and/or launch one or more of the contact applications 126. In some examples, the administrator device 106 may also run an instance of the desktop application 124, although functionality at the administrator device 106 is likely to be different from functionality at the representative devices 104.

The contact center server can also include additional functionality. For instance, and without limitation, the contact center server 102 is also illustrated as including a metrics component 128, a presence component 130, a quality component 132, and/or one or more models 134. Although these components are shown as integrated into the contact center server, in some examples some or all of the functionality associated with these components can be performed by different systems, computing devices, or the like.

The metrics component 128 generates metrics data. For instance, the metrics data may include quantifiable data about operations performed at the representative client devices 104. Such data may include time information, a duration of an interactive contact session, a duration between successive interactive contact sessions, a duration to accomplish a task other than an interactive contact session, or the like. The metrics data can also include information about a number of contemporaneous interactive contact sessions, a type of interactive contact sessions (e.g., bill pay, address change, general inquiry, dispute, new sale, customer service request, or the like), or the like. The metrics data can be generated in real-time or near-real-time. In some examples, metrics data may be used, e.g., by the representative client device 104 and/or by the contact center server 102, to determine a score or rating for the representative logged into or otherwise associated with the representative client devices 104.

The metrics component 128 may also be configured to display or otherwise present metrics data to a representative associated with the representative client device. Without limitation, the metrics component 128 can facilitate presentation of the data discussed above, as well as other data that may quantify aspects of the representative's performance and/or interactions in the contact center environment 100. Although not illustrated, the metrics component 128 can cause the metrics data to be displayed, e.g., via the desktop application, on the representative devices 104 and/or the administrator device 106. As noted above, some of the metrics data may be generated in real-time or near-real-time, and the metrics component 128 may update data displayed in the desktop application 124 in real-time or near-real-time. In some examples, the desktop application and/or the metrics component 128 may be configurable by the representative to display different metrics data, e.g., based on the representative's preferences, based on an administrator preference, or the like. As detailed further herein, the metrics data may be displayed to an administrator to identify representatives that may be candidates for monitoring.

The presence component 130 generates presence data. As used herein, presence data may be any data associated with whether a representative is available, e.g., to start a new interactive client session. For instance, presence data can be data indicating that the representative is logged into the representative client device, information about one of the contact applications 126 running via the desktop application 124 on the representative devices 104, information about additional application(s) running via the desktop application 124 and/or otherwise on the representative client devices 104, information about a number of interactive communication sessions active on the contact applications 126, or the like. Moreover, the presence data may be video, audio, or other data indicating that the representative is interacting with one of the representative client devices 104. In additional examples, the presence data may be information about computing resources associated with the representative client devices 104. For instance, certain of the representative client devices 104 may not support certain contact sessions, e.g., because those devices lack sufficient processing, hardware, software, or the like. The presence data can also include information about the representative associated with the representative client desktop, e.g., skills, training, certifications, authorizations, or the like, associated with the representative.

The presence component 130 may generate presence information based on sensed, detected, or otherwise automatically-obtained data. In other examples, the presence component 130 can also facilitate generation of a user interface via which a representative associated with one of the representative client devices 104 can input data relative to the representative's availability. For instance, the representative can indicate they are offline, on break, ending their shift, or otherwise unavailable via interaction with such a user interface. The user interface may also allow the user to indicate preferences regarding types of tasks, sessions, or the like, for which they are qualified, in which they are particularly interested, or the like.

In some examples, the presence component 130 may process the presence data, e.g., to determine a presence status associated with individual of the representatives. For example, the presence component 130 can make a binary determination, e.g., whether the representative is available or unavailable. In other examples, the presence component 130 may determine a likelihood, e.g., a probability, that the representative is available. The presence component 130 may include a model, e.g., a machine-learned model, that outputs the availability/presence determination. The machine-learned model may be trained on instances of data generated by the representative device 104. An example machine-learned model may be trained on prior work history of the representative, including but not limited to the interaction data, the metrics data, and the presence data discussed above. Without limitation, the machine-learned model may be a predictive model that determines whether the representative is available or unavailable, and in some instances, the types of tasks that the representative may be available to undertake and/or when the representative may be next available.

As noted above, the data, generated by the data generation component 112, the metrics data generated by the metrics component 128, the presence data generated by the presence component 130, and/or any other data generated by or otherwise received may be used by the contact center server 102 or other component in the contact center environment 100 to determine information associated with the representative client devices 104 and/or contacts involving the representative client devices 104. In some examples, some or all of this data may be generated at the representative devices 104 and transmitted to the contact center server 102, e.g., as real-time data. As detailed further herein, the contact center server 102 can generate additional information pertaining to the contact center environment 100, using this and other data from the representative client devices 104, as well as from other sources, as detailed herein.

For example, the quality component 132 determines quality for the contact center environment 100, including for individual representatives and/or for individual contacts or communication sessions. In more detail, the quality component 132 can receive information from about the representative client device, e.g., interaction data generated by the data generation component 112, the metrics data generated by the metrics component 128, and/or other data, and determine a score or metric for the representative associated with the representative client device 104. Conventionally, contact centers may determine quality metrics for representatives by manually reviewing one or more transcripts and/or listening to one or more audio recordings for each representative, and determining, e.g., relative to some criteria, the quality of the representative based on this interaction. Such conventional processes are time-consuming, subject to error and/or undue influence, and it is impractical to review a statistically significant number of interactions necessary to achieve a meaningful quality score. Conventional quality metrics may also be based on objective criteria, e.g., a time to dispose of an inquiry or a representative throughput. However, such metrics can be misleading, especially when customer satisfaction is of particular importance. Other conventional quality metrics may take into account customer sentiment, e.g., based on surveys or other customer satisfaction tools. However, customers are often unlikely to provide information via these tools, the information they often provide can be skewed toward extreme satisfaction or extreme dissatisfaction, and/or collection of such data can be subject to a lag.

Unlike these conventional techniques, the quality component 132 can be implemented using a trained model that can provide real-time, or near real-time, quality information. For example, the quality component 132 can receive interaction data from the interaction data generation component about in-process interactive communication sessions, e.g., via the contact applications 126. By analyzing these interactions in real time, the quality component 132 can generate one or more real-time scores for the call. For example, a first score may be a quantification of customer sentiment, and a second score may be associated with the representative's performance. For example, the customer's sentiment may be determined from words used, tone, voice cadence, voice volume, or the like. In some examples, quality metrics determined by the quality component 132 can be displayed to the representative client device 104 in real-time. Accordingly, the representative may have an understanding of how an interactive communication session is progressing, as the session progresses. In other examples, and as discussed below in connection with FIG. 2, quality metrics determined by the quality component 132 can be displayed to the administrator device 106 in real-time. Accordingly, the administrator may use the quality metrics to determine whether to monitor an interactive communication session.

As noted, a quality score for an interaction may be based at least in part on the customer sentiment for that interaction. The quality component 132 can also generate an overall score for the representative, e.g., based on a number of (or all) sessions conducted by the representative. In examples, quality metrics associated with the representatives can be stored as representative data. In other examples, the quality component can score, e.g., determine quality, on an interaction-by-interaction basis. For example, scoring each interaction may facilitate the creation of training materials. Without limitation, the highest scored interactions may be used to determine and/or update process flows for handling of similar, future interactions. Similarly, the lowest-scored interactions can be identified and used to develop re-training guidelines. Scores for each interaction can be stored with the data files generated for remote monitoring, discussed herein.

The model(s) 134 can be one or more models used to determine information for transmitting to the representative client devices 104 and/or to the administrator device 106. In some instances, the model(s) 134 can include machine-trained models for generating monitoring suggestions for the administrator. For example, the model(s) 134 can receive one or more of interaction data generated by the data generation component 112 during an interactive communication session, metrics data from the metrics component 128, and/or quality data from the quality component 132, and generate and send to the administrator device 106 prompts, in real-time, to monitor one or more specific representative devices. For instance, the model(s) 134 may perform natural language processing, text-based analysis, transcription analytics, and/or other analytics on interaction data associated with in-progress interactive communication sessions to identify issues as they arise during the session, including issues that may cause a change in customer sentiment or representative efficiency. Without limitation, the model(s) 134 can determine when a customer has raised a new issue, such as an issue for which the representative does not have adequate training, and alert the administrator that the representative may need coaching. Because data is generated and transmitted while the interactive communication session is in-progress, the mood or engagement of the customer can be gauged, and the administrator may be directed accordingly, e.g., to intervene and improve and/or maintain a current level of customer sentiment.

Figure 2:
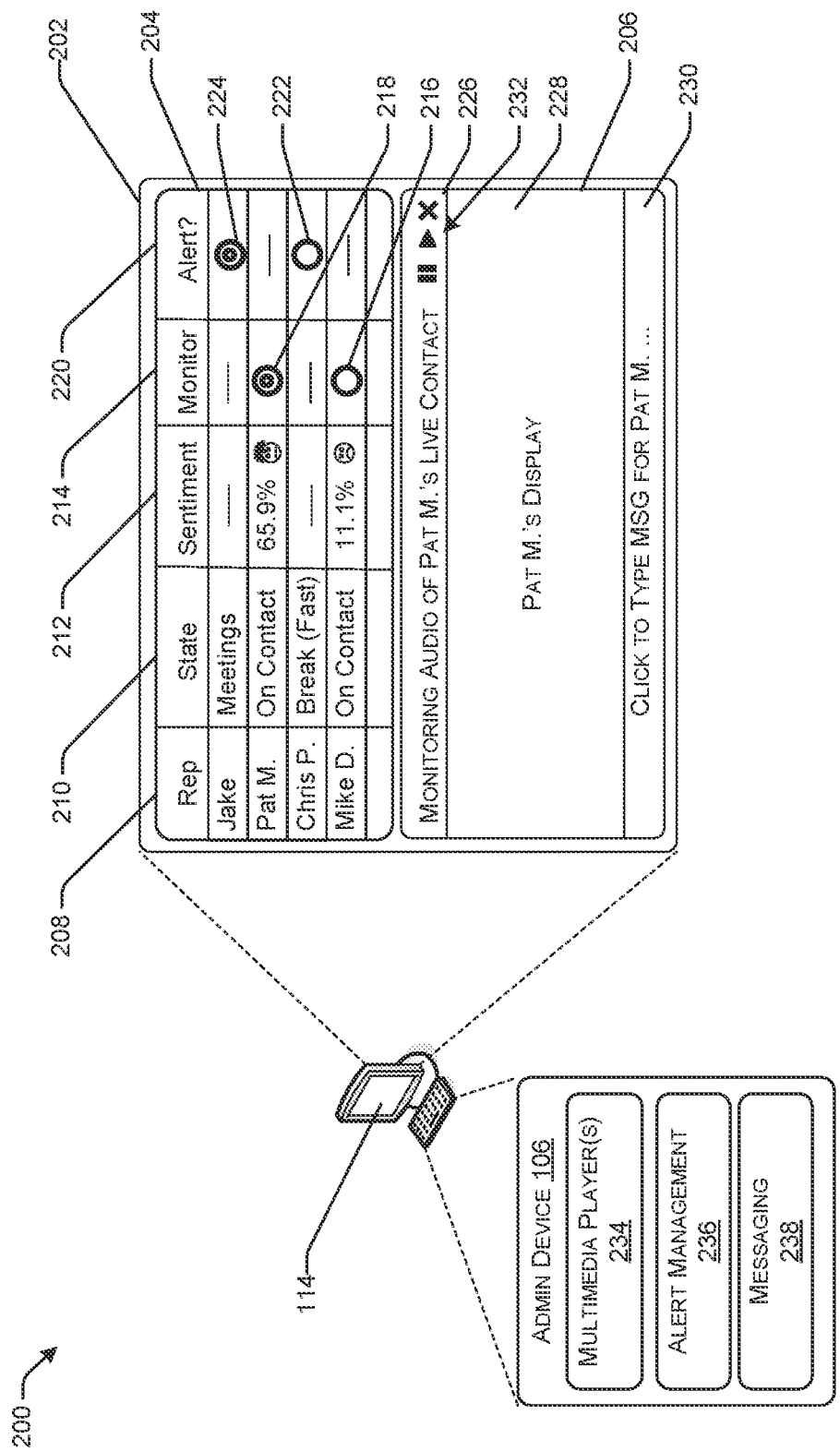
FIG. 2 is a schematic illustration of a computing environment showing additional aspects of communication and data generation for monitor representatives at an administrator device, in accordance with one or more examples of the present disclosure.

FIG. 2 is another schematic illustration showing additional aspects of representative monitoring according to aspects of this disclosure. More specifically, FIG. 2 shows an administrator device environment 200 including details about the administrator device 106 and an example of a graphical user interface 202 presented on the display 114 of the administrator device 106.

The graphical user interface 202 provides information about representatives to an administrator using the administrator device 106 and facilitates certain actions by components of the administrator device 106. More specifically, the graphical user interface 202 includes a first window 204 including information about a number of representatives, e.g., representatives overseen or managed by the administrator, and a second window 206 associated with monitoring a representative device, as described herein. Although the term "window" is used herein for convenience, "window" is understood to refer to any user interface or construct via which information is conveyed to the administrator associated with the administrator device. Without limitation, content, data, and/or information associated with the first window 204 and/or with the second window 206 can be presented via a separate display associated with the administrator device, via a single window or interface, or the like. The first window 204 and the second window 206 are intended to be example illustrations for carrying out functionality described herein. Other techniques may be used to implement these functionalities.

In the example of FIG. 2, the first window 204 is presented as a table including a number of rows and columns. Specifically, a first column 208 includes a listing of identities of representatives. The representatives in the first column 208 may include all representatives managed by the administrator associated with the administrator device 106, for example. In the illustrated example, the representatives are listed in the first column 208 by name, although other identifiers, such as work IDs, representative device IDs, or the like may be provided additionally, or instead. Although the first column includes only four representatives, more or fewer may be included. Moreover, in some examples, the A second column 210 of the first window 204 includes a state or status associated with each of the representatives. More specifically, the example second column 210 indicates that the representative "Jake" is in a meeting, representatives "Pat M." and "Mike D." are engaging in live contacts, and "Chris P." is on a break. In examples, the state may be determined at least in part on data from the remote monitoring component 108, the desktop application 124, the contact applications 126 and/or the presence component 130, discussed above. In some examples, the contact center server 102, e.g., using the remote monitoring component 108 and/or the presence component 130, may determine a status, or a likely status, for each representative and/or each of the representative devices 104 associated with the administrator and cause the status to be presented in the second column 210. In addition to the data shown and/or indicated as being generated in connection with FIG. 1, the contact center server 102 may also be configured to receive or access information about scheduling, workflow management, or the like, e.g., to determine what representatives are (or should be) working at a given time, break schedules, task assignments, or the like. In some examples, the second column 210 may provide the administrator with a visual for understanding how a workforce including the representatives is presently deployed. Of course, FIG. 2 is for example only; more or different state descriptors may be used in the second column 210.

A third column 212 of the first window 204 includes a representation of sentiment or quality data associated with interactions between the associated representative and a customer. In the example of FIG. 2, the "sentiment" presented in the third column 212 may be a quantification and/or representation of a user or customer experience associated with the ongoing contact. The example includes a numerical value, expressed as a percentage, and a pictorial representation, e.g., an emotive icon, associated therewith. The percentage and the icon are for example only and may be replaced with or further associated with one or more different representations indicative of an ongoing user interaction. In examples, "sentiment" generally refers to a quantification of customer satisfaction and may be based at least in part on characteristics of audio of the customer (e.g., tone, inflection, or the like), words used by the customer, and/or any other factors, as detailed herein. Aspects of the sentiment may be determined by the contact applications 126, the metrics component 128, the quality component 132, the model(s) 134; and/or other components detailed herein. In other instances, and without limitation, instead of or in addition to the percentage and the icon, the third column 212 may include an overall score, e.g., on a scale of 1 to 7, 1 to 10, 1 to 100, or the like, a textual description, such as "excellent," "good," "fair," "poor," or the like, or other representation.

The sentiment data in the third column 212 pertains to in-process interactions. For example, the sentiment score or metric can be generated in real-time or near real-time and presented in the third column 212 as it is available. Accordingly, the third column 212 includes data only for the representatives "Pat M." and "Mike D.," because those two representatives are "on contact," or otherwise performing interactions that would result in a real-time sentiment. In the illustrated example, by showing a real-time or near real-time assessment of sentiment, the administrator may readily identify those in-flight interactions in which the administrator may want to monitor or assist. In other examples, however, the third column may include data not associated with live contacts. For instance, a different score or metric associated with the representative may be presented. Without limitation, the third column 212 may include the sentiment score or metric for the representative's last call, an average of some predetermined number of previous calls, or the like.

A fourth column 214 of the first window 204 is an interactive column that allows the administrator using the administrator device 106 to selectively monitor representatives. In the fourth column 214, a first icon 216 is presented in association with the representative "Mike D.," and a second icon 218 is presented in association with the representative "Pat M." In examples, the first icon 216 may be a selectable icon that facilitates monitoring the associated representative, whereas the second icon 218 is displayed when the first icon 216 is selected. Stated differently, in FIG. 2, the first icon 216 may indicate that the associated representative is available for monitoring, whereas the second icon 218 is displayed in association with one or more of the representatives being monitored. In operation, an administrator may select the first icon 216 associated with the representative "Mike D." to begin monitoring that representative, as described further herein. In examples, selection of the first icon 216 may be performed by pointing and clicking with an input device, touching a location on the display 114 corresponding to the first icon 216, or otherwise. Once selected, the first icon 216 associated with the representative "Mike D." may be replaced with the second icon 218, e.g., to indicate that representative is now being monitored. Similarly, selection of the second icon 218 may end an active monitoring session. Processing operations taken in response to selection of the first icon 216 and/or the second icon 218 are described further herein.

In the example of FIG. 2, the first icon 216 or the second icon 218 may be associated with representatives involved in an active communication session or contact. So, for example, because the representative "Jake" is in meetings and the representative "Paul" is on a break, no icons are provided in the fourth column 214 in association with those representatives. In other examples, different icons or other graphical representations can be used and/or icons may be provided also in association with representatives not on a contact. Regarding the latter, in some examples an icon indicating that such representative is not presently able to be monitored may be presented.

A fifth column 220 of the first window 204 is an interactive column that allows the administrator using the administrator device 106 to set alerts to be notified when a representative is capable of being monitored. In the fifth column 220, a first alert icon 222 is presented in association with the representative "Chris P.," and a second alert icon 224 is presented in association with the representative "Jake." In examples, the first alert icon 222 may be a selectable icon that facilitates setting an alert to monitor the associated representative, whereas the second alert icon 224, which indicates that an alert has been set (as detailed further herein) is displayed when the first alert icon 222 is selected. Stated differently, the fifth column 220 in the example of FIG. 2 includes an icon that can be toggled between a first state (e.g., the first alert icon 222) showing that an alert is set in connection with monitoring the associated representative and a second state (e.g., the second alert icon 224) indicating that the administrator will be alerted when the associated representative is capable of being monitored. In examples, toggling between the first alert icon 222 and the second alert icon 224 may be performed by pointing and clicking with an input device, touching a location on the display 114 corresponding to the alert icon, or otherwise.

In the example of FIG. 2, the fifth column 220 includes icons associated only with representatives that are not presently on a contact, because, as discussed above, an administrator can monitor an active contact by interacting with icons in the fourth column 214. In other examples, however, the fifth column 220 may facilitate setting alerts for any/all representatives. For instance, although the representative "Mike D." is on a contact in the example of FIG. 2, the first window 204 could include an instance of the first alert icon 222, e.g., such that the administrator could be alerted when the representative "Mike D." starts a new contact, or the like. In other examples, different icons or other graphical representations can be used and/or icons may be provided also in association with representatives for setting alerts. Also in some examples the fourth column 214 and the fifth column 220 may be combined. For instance, in the illustrated embodiment the first icon 216 and the second icon 218 are associated with representatives on a contact, whereas the first alert icon 222 and the second alert icon 224 are associated with representatives not on a contact. In some examples these two columns could be merged, although in such an example the first icon 216, the second icon 218, the first alert icon 222, and/or the second alert icon 224 may be modified, e.g., to differentiate between functionality for monitoring and setting alerts.

The second window 206 is a monitoring window, e.g., via which the administrator can monitor representatives. As noted above, in the example of FIG. 2, the first window 204, as evidenced by the second icon 218, indicates that the representative "Pat M." is being monitored by the administrator device 106. The second window 206 includes example aspects of this monitoring. More specifically, the second window 206 includes a banner 226 or status bar indicating that the administrator device 106 is "monitoring audio of Pat M.'s live contact." In the illustrated example, the banner 226 provides the name of the representative being monitored, e.g., "Pat M.," and the type of media used for the contact, e.g., "audio." In other examples, the banner 226 could provide other or additional information, including but not limited to an identification and/or information about the customer or contact, information about the subject of the contact, an indication that the contact is recorded (e.g., not live), or the like. Moreover, in examples in which the monitored live contact is a text-based live contact, e.g., chat or messaging, the banner 226 may include a transcript of the contact. In some examples, the banner 226 may function as the visual indicator 118, discussed above.

The second window 206 also includes a display monitoring section 228. The display monitoring section 228 provides a representation of the monitored representative's display. In the example of FIG. 2, because Pat M. is being monitored, the monitoring section 228 includes a "mirror" or other representation of Pat. M's display. As detailed herein, in addition to monitoring the content of the live contact, e.g., the representative interaction with the customer, aspects of this disclosure also facilitate presentation of the representative's display to an administrator, so the administrator can understand an entirety of how the Examiner is processing the contact. The presentation of the display in the monitoring section 228 is synced or otherwise coordinated with the presentation of the actual contact, e.g., the audio in the example of FIG. 2, to provide a view of the contact akin to the administrator sitting next to (and sharing an audio output with) the representative during the contact. As also detailed herein, the monitoring section 228 may continue to display the monitored representative's display even after the live contact is finished, e.g., after the voice conversation is terminated, so the administrator can monitor any post-processing or associated tasks performed by the representative, e.g., prior to the representative accepting a next live contact. In examples, the monitoring section 228 may be an exact copy of the representative's display, e.g., showing all applications open, all cursor movements, all data entry, and/or the like. In examples in which the representative has multiple displays, the monitoring section 228 may show all displays.

The second window 206 also includes a messaging section 230, which may be the messaging section 122 shown in FIG. 1 and discussed above. In the illustrated example, the messaging section 230 is a data-entry section in which the administrator can compose messages, attach links, generate graphics, or the like, for presentation to the representative. In some examples, the messaging section 230 may also include a "send" or similar interface element selection of which generates a signal to transmit the message to the representative. The messaging section 230 may provide the administrator with a communication means for assisting the representative during the live contact.

The second window 206 also includes functional interface elements 232 that provide the administrator with control over presentation of the content associated with contact. For instance, the functional interface elements 232 are indicated as including a "pause" interface element, a "play" interface element, and a "close" interface element. In examples, pressing the pause button will stop presentation of the audio and of the video in the monitoring section 228. For instance, if the administrator's attention is required elsewhere, the administrator may pause the monitoring session using the functional interface elements 228, e.g., by interfacing with the "pause" interface element. When the administrator is able to return to monitoring, the administrator may resume monitoring using the functional interface elements, e.g., by interfacing with the "play" interface element. In some examples, the administrator will resume the contact at the point at which it was paused, e.g., such that the monitoring is no longer in real time or near-real time. For instance, because the remote monitoring component 108 generates and stores data associated with contacts, implementations of this disclosure can allow for both real time (or near-real time) presentation of the contacts, or on-demand playback of such contacts. When the presentation of the live contact has been paused and resumed as just described, aspects of the user interface 202 may change. For instance, and without limitation, the banner 226 may be updated to indicate that the contact is a playback, e.g., not live. Similarly, the messaging functionality associated with the messaging section 230 may be disabled. In other examples, selection of the "play" interface element may resume the live contact at a real time position, e.g., as if the administrator walked away from a continuous playback and came back to that playback at a later point in time. The "close" interface element may be selected to stop monitoring, e.g., by closing the second window 206. The functional interface elements 232 are illustrated in the banner 226, but in other implementations could be provided anywhere in the user interface 202. More, fewer, or different interface elements also may be provided and/or functionality ascribed to the functional interface elements 232 may be otherwise enabled. Regarding the latter, and by way of example, the administrator may select the second icon 218 to stop monitoring the representative Pat M., and/or the administrator may select the first icon 216 to begin monitoring the representative Mike D. in the second window 206. The layout of the graphical user interface 202 is for example only. In examples, any layout that facilitates selection of representatives for monitoring and/or facilitates monitoring of representatives, e.g., by facilitating presentation of multimedia associated with a live contact and of video associated with the representative's display may be used.

The graphical user interface 202 is illustrated and described to show aspects of representative monitoring according to aspects of this disclosure. As also illustrated in FIG. 2, the administrator device 106 includes several components to facilitate the functionality described above. Specifically, the administrator device 106 is illustrated as including one or more multimedia players 234, an alert management component 236, and a messaging component 238.

The multimedia device(s) 234 include any devices used to play or present content at the administrator device 106. Without limitation, the multimedia device(s) 234 can include speakers, the display 114, audio jacks, video output devices, or other components integrated into the administrator device 106. In other examples, the multimedia device(s) 234 can be separate from, but associated with, the administrator device 106. For instance, the multimedia player(s) 234 can include wired or wireless audio and/or video output devices. The multimedia player(s) 234 generally include any computing device that facilitates presentation of content associated with a live contact and/or of a representative display, as described herein, e.g., in response to a user selection of the icon 216 or other selection to monitor a representative.

The alert management component 236 includes functionality to generate and store alerts. For example, in response to the user selection of the first alert icon 222, the alert management component 236 may receive a signal to generate an alert associated with the representative device associated with the representative "Chris P." For instance, the alert management component 236 may receive information about the commencement of contacts, determine that a contact has commenced that includes the representative "Chris P.," and cause an alert to be displayed to presented to the administrator indicating that the contact has commenced and/or that "Chris P." may now be monitored. In examples, the alert management component 236 can generate a visual alert that is presented on the graphical user interface 202. For instance, the alert management component 236 can cause the fourth column 214 to be updated to include an instance of the first icon 216 in connection with the representative "Chris P." In other examples, a portion of the row associated with the representative "Chris P." can be altered, e.g., by changing color, blinking, or the like. In further examples, a separate window or banner (not illustrated) may be presented that alerts the administrator to the commencement of the contact associated with the representative "Chris P." Other types of alerts, e.g., audible alerts, text-based alerts, e-mail alerts, or the like can be generated in other instances.

The messaging component 238 facilitates messaging in the remote monitoring system. For instance, the messaging component 238 can receive data associated with a message generated by an administrator, e.g., via the messaging section 230, and cause the message to be presented to the representative being monitored. As detailed herein, the messaging component 238 can enable socket-level communication between devices, e.g., the contact center server 102, the representative devices 104, and/or the administrator device 106. Also in examples, the messaging component 238 can receive data from the alert management component 236 and, based at least in part on that data, cause a message, e.g., as the alert, to be presented on the display 114 of the administrator device 106 or otherwise presented. Although the alert management component 236 and the messaging component 238 are illustrated as part of the administrator device 106, in other examples one or both of these components may instead be associated with the contact center server 102, e.g., integrated into the remote monitoring component 108.

Figure 3:
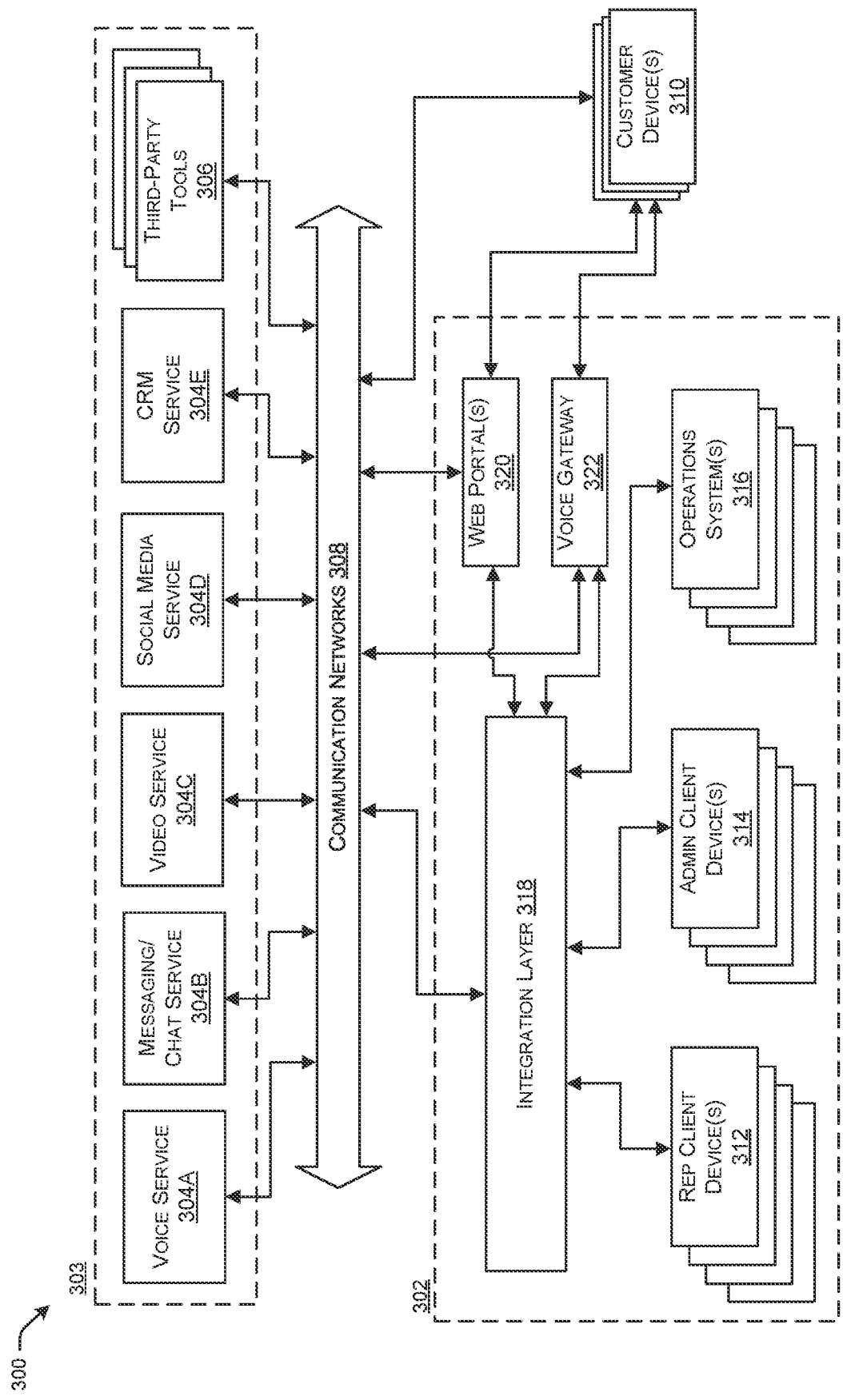
FIG. 3 illustrates a computing environment associated with an automated contact center, including various internal and external computer systems, services, and user devices, in accordance with one or more examples of the present disclosure.

FIG. 3 illustrates an example computing environment associated with a contact center 300. The contact center 300 may be, or may include, the contact center environment 100. The contact center 300 may be a fully automated and/or semi-automated contact center environment. In this example, a first dotted box identifies internal services 302 of the contact center 300, and a second dotted box identifies external services 303 associated with the contact center 300. As used herein, an internal component of a contact center may refer to a component (e.g., computer server or device, network component, software service, application, etc.) that is controlled by the organization operating the contact center. For example, the contact center server(s) 102 and the representative device 104 may be internal components of the contact center 300. In contrast, an external component of the contact center 300 may refer to a component that interacts with at least one internal component of the contact center 300, but which is not controlled by the organization operating the contact center 300. As shown in this example, the external components may include a number of external communication services 304A-304E (collectively "the services 304") and/or tools 306. The services 304 and/or the tools 306 may be provided by third-party service providers. Additional external components may include communication network(s) 308 and one or more customer device(s) 310 that communicate in interactive sessions with representatives (e.g., employees, contract workers, etc.) of the organization.

In some implementations, the internal components of the contact center 300 may reside within a single server, e.g., the contact center server 102, and/or single data center operating at one geographic location. In such cases, some or all of the internal components of the contact center 300 may communicate via a secure private network such as a private LAN or secure corporate network protected by a firewall. In other implementations, the internal components may be distributed across multiple servers and/or multiple data centers that operate at different geographic locations. Internal components that are distributed across data centers may communicate via secure private networks and/or via unsecure public networks (e.g., the Internet) and may use tunneling and encryption technologies. As illustrated, the internal and external components of the contact center may communicate via the communication networks 308, including but not limited to computer networks (e.g., TCP/IP networks, etc.), wireless networks (e.g., Long-Term Evolution (LTE), 7G, a Universal Mobile Telecommunications Service (UMTS), Global System for Mobile communications (GSM) networks, etc.), satellite networks, and the like.

In operation, the contact center 300 may be implemented via the computing environment shown in FIG. 3 to provide interactive communication sessions (or interactive sessions or contacts) between customers using the customer device(s) 310, and one or more representatives of the organization using one or more representative client device(s) 312. The customer device(s) 310 and/or the representative client device(s) 312 may be any personal computing devices, such as desktop or laptop computers, mobile devices (e.g., smartphones, tablet computers, etc.), wearable computing devices, or any other device capable of communicating over the communication network(s) 308. The representative client device(s) 312 can include the representative client devices 104. In some scenarios, a customer, client, or other individual associated with the organization may use the customer device(s) 310 to contact the organization via a point-of-contact service, such as one or more web portals 320 or a voice gateway 322. In some examples, the contact center 300 may support different services for different communication types, such as the web portal(s) 320 that processes web chat requests received via the web site of the organization, the voice gateway 322 that processes calls received via a telephone network and/or Voice over IP (VOIP) calls. Although two portals/gateways into the contact center 300 are shown in this example, any number of additional customer portals/gateways may be used in other implementations, such as portals or gateway services for voice communications from the customer device(s) 310, video communications, messaging/chat communications, social-media based communications, customer relationship management (CRM) based communications, or the like.

After one of the customer device(s) 310 initiates communication with the contact center 300, or vice versa, the contact center components may assign the customer to a representative and initiate an interactive session between the customer device and one of the representative client device(s) 312, e.g., associated with the assigned representative. Interactive sessions may include voice sessions, video sessions, messaging/web chat sessions, social media sessions, CRM sessions, and/or other sessions. As shown in this example, the contact center 300 may use external services 303 to implement the functionality of providing interactive sessions between customers and representatives. For instance, the contact center 300 in this example uses a voice service 304A from a first external service provider, a messaging/chat service 304B from a second external service provider, a video service 304C from a third external service provider, a social media service 304D from a fourth external service provider, and so on. In various examples, the contact center 300 may use any combination of external or internal communication services.

The external services 303 may include communication services to implement interactive sessions between a customer and a contact center representative, as well as additional services/tools to support additional features and functionalities of the contact center. For instance, the third-party tools 306 may be provided via external service providers and accessed by the internal systems of the contact center 300. Such third-party tools 306 may include, by way of illustration only, transcript generation and/or analysis tools, customer sentiment analysis tools, sales script tools, contact monitoring tools, data analytics tools, workforce management tools, post-interactive session survey tools, etc. As with the communication services 304A-204E, the third-party tools 306 are depicted in this example as external components of the contact center 300, but some or all of these tools may be implemented as internal components, within the contact center 300.

As shown in FIG. 3, a customer may initiate communication via the web portal(s) 320 or the voice gateway 322, after which the contact center components select a communication service 304A-304E based on the communication type used by the customer, and an interactive session is initiated between the customer device 310 and the representative client device(s) 312. In some examples, aspects of the communication services 304A-304E may be implemented at the representative client device(s) 312 via the contact application(s) 126. Although in this example the customer devices 310 are depicted as initiating communication sessions by first contacting an internal component of the contact center (e.g., web portal 320 or voice gateway 322), in other examples the customer devices 310 may initially contact an external communication service 304A-304E. For example, customer service links on the organization's web site may be hosted by and/or redirected to the external services 303. In some cases, the customer communication into the contact center may be answered first by an automated computer system (e.g., implemented within one of the external services 304 or the operations system(s) 316), which requests a series of inputs from the customer. Such automated systems may be implemented as voice response units for voice calls, conversation bots for web chat sessions, etc. The inputs requested from the customer via an automated system may include data identifying the customer (e.g., customer name, account number, ticket number, etc.), the purpose of the contact (e.g., a question type, a product model, etc.), or the language or geographic region of the customer, and the like. Based on the customer's responses, the automated system may determine where to direct the customer for an interactive session, for instance, to a particular data center, department of the organization, a representative having a particular role, criteria, or credentials, or to a particular representative that has had previous contact with the customer.

In some examples, certain internal components of the contact center may be used to select one of the external services 304 and initiate a communication session between a customer device 310 and one of the representative client device(s) 312, after which the internal components may extricate themselves from the process and allow the selected external service 304 to manage the session. For example, as described below, operations system(s) 316 and internal computer servers and/or components within the integration layer 318 may receive and analyze data associated with incoming requests for interactive sessions from customer devices 310 and assign the interactive sessions to the services 304 and the representative client device(s) 312 to perform the interactive sessions. The operations system(s) 316 and integration layer 318 also may receive and handle requests to transfer contacts from one representative to another, initiate multi-party interactive sessions, and initiate communication sessions between client device(s) 312 and administrator client device(s) 314 or entities within the contact center environment. The various operations system(s) 316 and components within the integration layer 318 also may monitor and analyze the interactive sessions to determine performance metrics for representatives and the contact center as a whole, and to implement policies and instructions based on various models (e.g., contact quality models, efficiency models, workflow projection models, etc.). In aspects of this disclosure, the integration layer may facilitate the remote monitoring functionality described herein. Without limitation, the integration layer 318 can include the remote monitoring component 108 and/or other components and aspects of the contact center server 102 and/or the administrator device 106.

The integration layer 318 may provide a common interface between the internal systems and components of the contact center 300 and the external services 303 used by the contact center. For example, the representative client device(s) 312 may communicate with the external communication services 304A-304E and third-party tools 306 via components within the integration layer 318. In some cases, the integration layer 318 provides a common framework for interfacing with the external services 303, so client applications, e.g., the contact applications 126, executing on the representative client device(s) 312 may perform similar or identical operations regardless of which external service provider is used. In such examples, the integration layer 318 provides technical advantages and improves the functioning of the contact center components by providing support for plug-and-play among the external communication services 304 and/or the third-party tools 306, without requiring any software change within the client applications executing on the representative client device(s) 312, the administrator client device(s) 314, and/or the customer device(s) 310.

For instance, a voice service 304A provided by a third-party vendor for the contact center 300 may be replaced by a different voice service 304A provided by a different third-party vendor, without requiring any functional change to the client applications, e.g., the contact applications 126 and/or the desktop application 124 executing within the representative client device(s) 312 and/or the administrator client device(s) 314. Similarly, the integration layer 318 may interface with multiple different external services 303 for a single communication type (e.g., multiple different voice services 304A, multiple different messaging/chat services 304B, etc.) simultaneously, so the contact center can use multiple external services 303 for a single communication type at the same time, in a manner that is transparent with respect to the external services 303, the representative client device(s) 312, and/or the administrator client device(s) 314. In such cases, an external communication service 304 may operate similarly or identically regardless of whether the contact center is using another service provider to provide an alternative communication service. The representative client device(s) 312 and/or the administrator client device(s) 314 also may operate similarly or identically regardless of which of the external services 303 (or the internal services 302) is providing an interactive session for the representative client device(s) 312.

The integration layer 318 also may provide an interface between internal components of the contact center (e.g., the representative client device(s) 312, the administrator client device(s) 314, the operations system(s) 316) and third-party tools 306 which operate as services or applications external to the contact center 300. For instance, the internal operations system(s) 316 of the contact center may access third-party tools 306, such as data analytics tools, workforce management tools, etc., via the integration layer 318. The representative client device(s) 312 also may access the third-party tools 306 via the integration layer 318 during an interactive session between a representative and customer. The third-party tools 307 can include customer sentiment tools, post-interactive session survey tools, or the like. As noted above, the integration layer 318 may provide a uniform and common interface for accessing external third-party tools 306, so that various third-party tools 306 may be added, removed, replaced, or upgraded, without requiring any changes to the application software of the contact center internal components.

Additionally, the integration layer 318 may provide an interface between various internal components of the contact center. For example, the representative client device(s) 312 may communicate via the integration layer 318 with other of the representative client device(s) 312, with the administrator client device(s) 314 and/or with other internal servers/systems of the contact center 300. For instance, the integration layer 318 may perform operations associated with sending and receiving interaction data generated by the data generation component 112, within the contact center 300. The integration layer 318 may also facilitate transmission of messages, e.g., entered at the messaging section 122 and/or generated by the messaging component 238. For instance, and with reference to FIG. 1, the integration layer 318 may support functionality associated with the metrics component 128, the presence component 130, the quality component 132, and/or other components described herein.

The operations system(s) 316 may be implemented within internal computer servers of the contact center 300, and may provide functionalities for common queuing, monitoring, and analysis and modeling, and policy implementations across the contact center. For instance, the operations system(s) 316 may include the workforce remote monitoring component 108, the metrics component 28, the presence component 130, the quality component 132, and/or the representative model(s) 134. The representative client device(s) 312 may communicate with various of the operations system(s) 316 via the integration layer 318, allowing the operations system(s) 316 to receive data regarding the interactive sessions executed on the representative client device(s) 312, analyze and/or model the data, and determine operational instructions for the representative client device(s) 312 to implement operational models (e.g., rules and/or policies) across the contact center. Such models may include quality control models, workforce management models, contact center efficiency models, etc.

As illustrated by these examples and the other examples described herein, the integration layer 318 may provide additional technical advantages within contact center environments, including improving the functioning and efficiency of client device(s) 312 and other internal operational system(s) 316. For instance, the integration layer 318 may provide a common queuing framework for client device(s) 312, which is capable of managing the work queue(s) for the representative client device(s) 312 (e.g., live customer contact queues, deferred work item queues, etc.) received from various external and internal contact center services. As noted above, the integration layer 318 also may provide internal operational system(s) 316 with detailed data regarding interactive sessions from diverse representative client device(s) 312 in a consistent and uniform manner, allowing the operational system(s) 316 to improve the performance, contact quality, and workflow across the contact center. For instance, the integration layer 318 may facilitate real time sentiment analysis and/or real time generation of data allowing for real time monitoring of representative communication sessions. The operations system(s) 316 also may include rules engines using heuristics and/or trained machine-learned models to analyze the interactive session data received from different client device(s) 312, and may transmit instructions and/or policies to the representative client device(s) 312 across the contact center to implement uniform and consistent models.

The integration layer 318 is depicted in FIG. 3 as a separate internal component of the contact center. In such examples, the integration layer 318 may include one or more dedicated computer servers and/or software applications or services configured to perform the functionalities of the integration layer 318 described herein. In other examples, the integration layer 318 depicted in FIG. 3 may represent a conceptual layer, in which some or all of the components and functionalities of the integration layer 318 may be implemented within other internal or external devices and systems. For instance, any or all portions of the integration layer 318 may be implemented within the external communication services 304 and/or other external services provided by third-party vendors. Additionally or alternatively, some or all of the integration layer 318 may be implemented within the representative client device(s) 312, administrator client device(s) 314, and/or operations system(s) 316 within the contact center. For example, the representative client device(s) 312 may run a desktop application and/or communication façade(s) to initiate and manage communications with external services 304 and other internal components/systems. These applications, façades, and other services or interfaces of the representative client device(s) 312 and/or other operations system(s) 316 of the contact center may implement various portions of the integration layer 318.

Figure 4:
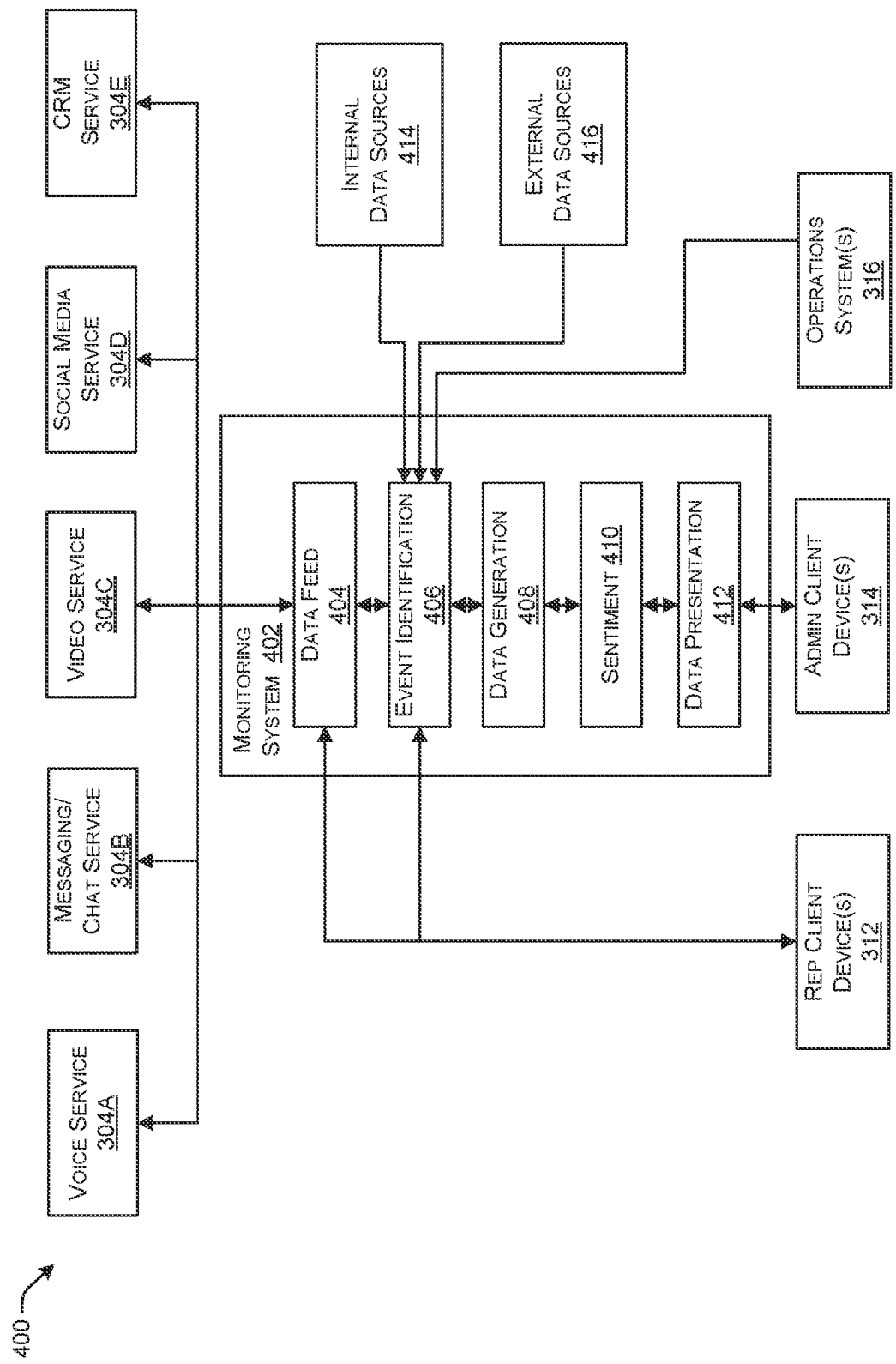
FIG. 4 illustrates an example of a contact center framework for implementing representative monitoring, in accordance with one or more examples of the present disclosure.

FIG. 4 illustrates a computing architecture 400 including a monitoring system 402 with various components for performing operations with a contact center environment, such as the contact center environment 100 or the contact center 300. For example, the computing architecture 400 may be a portion of a contact center environment, such as the contact center server 102 and/or the monitoring system 402 can include aspects of the remote monitoring component 108. In this example, the monitoring system 402 includes a data feed component 404, an event identification component 406, data generation component 408, a sentiment analysis component 410, and a data presentation component 412. As detailed further below, the various components of the monitoring system 402 may receive, store, and use data from various different sources, including data relating to live contacts handled by the contact center 300. A live contact may refer to an ongoing or interactive communication session between one of the customer device(s) 310 and the various components of the contact center 300, including customer-requested sessions that are in-queue and awaiting assignment, on-hold, as well as active interactive communication sessions between the customer device(s) 310 and one of the representative client device(s) 312.

In various examples, the monitoring system 402 may be implemented as a single computing device or server, or as a combination of multiple interconnected devices and/or servers, e.g., within the integration layer 318 of the contact center 300 and/or at the contact center server(s) 102. As such, the monitoring system 402 and associated software components, e.g., one or more of the data feed component 404, the event identification component 406, the data generation component 408, the sentiment component 410, and/or the data presentation component 412 may include and/or may be executed on hardware-based computing devices or servers having hardware/network infrastructures and components such as processor(s), computer-readable memory, network interface(s), etc. Additionally or alternatively, some or all portions of the monitoring system 402 and/or its associated components described herein may be implemented within other systems internal or external to the contact center 300, such as within the representative client device(s) 312, the administrator client device(s) 314, and/or within the operations system(s) 316 of the contact center 300.

As detailed above with relation to FIG. 3, the contact center 300 may support a number of different communication session types, which may be initiated, managed, and/or supported by the communication service providers 304. In various examples, the communication service providers 304 may be external to the contact center 300. In this example, the monitoring system 402 may receive information from the communication service providers 304A-304E to establish network connections and stream media between customer device(s) 310 and the representative client device(s) 312. When the contact center 300 receives a customer request for an interactive session, the request may be assigned to a particular one of the communication service providers 304 based on the communication media type and/or based on the communication gateway or portal from which the customer accessed the contact center (e.g., voice, video, web chat, social media, etc.). The assignment may also be based on one or more other criteria, including but not limited to a geographic location or region of the customer, current service provider status, current contact center status, or the like. If a qualified representative is immediately available to handle the request, the contact center, using services from the communication service providers 304, may establish the network connections to initiate and manage the interactive session between the customer device(s) 310 and the representative client device(s) 312 of the available representative. Otherwise, the customer request may be queued during which the customer device(s) 310 may remain connected to the contact center, e.g., a representative is available to handle the contact.

At any time during a live contact with the customer device(s) 310, including when the contact is in-queue, on-hold, or when the contact is connected to one of the representative client device(s) 312, the contact center 300 may generate data relating to the live contact. As shown in this example, the live contact-related data may be transmitted from the service providers 304 to the monitoring system 402, e.g., the data feed component 404. For instance, the communication service providers 304 may output data indicating a change in the status of the live contact, such as when the contact is first received, queued, connected to one of the representative client device(s) 312 or one of the administrative client device(s) 314, placed on hold, disconnected or terminated, etc. Additionally, the communication service providers 304 may generate and output data based on any user inputs received via the customer device(s) 310 before the customer is connected to a representative, such as the customer's responses to an automated menu or voice response unit (VRU) for voice contacts, or responses to a conversation bot for web chat contacts. The communication service providers 304 also may generate and output status data relating to the network connection and quality (e.g., network types and access networks, network traffic and performance, available bandwidth, etc.) and media quality (e.g., media resolution, latency issues, buffering events, etc.).

Moreover, and as detailed above, individual of the representative client device(s) 312, including the representative client devices 104, may include functionality to generate, in real-time, information about an interactive communication session. Such data can also be received at the data feed component 404. In some examples, the data feed component 404 can receive video or other image data associated with a monitor, display or user interface associated with the representative client device(s) 312, e.g., for display in the monitoring section 228 of the graphical user interface 202, discussed above. The representative client device(s) 312 can also stream or otherwise provide data to the data feed component 404 about in-process interactive sessions.

The data feed component 404 within the monitoring system 402 may receive data from the communication service providers 304 and/or from the representative client device(s) 312 relating to the current live contacts (e.g., queued, on-hold, or during an interactive media session) of the contact center 300. Depending on the size and scale of the contact center 300, the data feed component 404 may receive data associated with hundreds or even thousands of live contacts concurrently, e.g., from the communication service providers 304 and/or from the representative client device(s) 312, such as via the desktop application. In some examples, the monitoring system 402 may subscribe to receive steams of event data from the communication service providers 304 relating to live contacts for the contact center 300. Such subscriptions may include push notifications transmitted from the communication service providers 304 to the data feed component 404, where each notification subscription may include events for a single contact, group of contacts, or for all contacts associated with the contact center 300. In some instances, the communication service providers 304 may output event data to cloud-based data stores or other data repositories. In such cases, the data feed component 404 may subscribe to receive event notifications from the cloud data stores/repositories, or may periodically query the cloud data stores/repositories to retrieve the updated event data for any live contacts of the contact center 300. In still further examples, the data feed component may receive data, e.g., streams of data, from the various representative client device(s) 312. For instance, the data feed component 404 can receive the interaction data generated by the data generation component 112. In still further examples, the data feed component 404 may receive, store, or access any or all of the data and/or information discussed above, including data generated by the contact center server 102, the representative devices 104, and/or the administrator device 106, as described herein.

The event identification component 406 receives information from various sources, and identifies events in the information. As noted above, the data feed component 404 can generate or receive a data feed and the event identification component 406 can identify events in the data feed. By way of non-limiting, the event identification component 406 can identify a first event associated with commencement of a new contact and a second event associated with conclusion of the interaction. For instance, this example first event may be associated with a contact of one of the customer device(s) 310 with the contact center 300 or, in other examples, with assignment of a contact or interactive session to one of the representative device(s) 104. The event identification component 406 can identify the conclusion of the interactive data session. For instance, the event identification component 406 can identify conclusion of a voice-based contact, a video-based contact, a messaging-based contact, or the like, by determining that the messaging has ended, the related service 304 has disconnected from the contact center, or the like.

In addition to receiving information from the data feed component 404, the event identification component 406 is also illustrated as receiving information from internal data sources 414, external data sources 416, and the representative client device(s) 312. For instance, the event identification component 406 can receive scheduling and/or task-assignment information associated with representatives and determine events based thereon. Without limitation, the event identification component 406 may identify events associated with when a representative begins a shift, changes tasks, is scheduled for a break, or the like. Also in examples, the event identification component 406 can receive signals from the representative client device(s) 312, including a signal indicating that a representative is ready for a new contact. In some examples, the representative client device(s) 312 may have associated user interfaces via which the representative can indicate a readiness to accept a new contact. Such an input may also be generated automatically upon the representative finishing a contact and/or processing associated with a contact.

The data generation component 408 includes functionality to generate data associated with individual contacts, e.g., based on the data feed from the data feed component, information from the event identification component 406, and/or other sources. In some instances, the data generation component 408 may be the data generation component 112 discussed above, and can include any or all of the functionality associated with that component. Without limitation, the data generation component can generate a data file associated with an individual contact into the contact center 300. For instance, the data generation component can generate a data file that associates the content of the contact, e.g., the interaction between the representative device(s) 312 and the customer device(s) 310, and video of the display(s) of the representative customer device(s) 312. In one example, the data generation component 408 can begin generation of a data file upon initiation of a contact, e.g., in response to receiving an event notification associated with the contact commencing and continue generating the data file until receiving a second event notification associated with the conclusion of the contact.

In another example, the data generation component 408 can generate a data file that includes video of the representative interface even after the interactive portion of the contact concludes. Without limitation, the data file may contain both media or content data corresponding to the live contact or customer interaction and video data of the representative's interface until the live contact ends and then include only the video data of the representative's interface after conclusion of the live contact. Thus, execution or playback of the data file, e.g., at the administrator device 106, may cause both the media of the call and the video of the representative display to be presented for a first amount of time, and then continued display of the video of the representative display after conclusion of the representative/administrator interaction. In practice, the data file can commence at a time associated with a first event notification, e.g., corresponding to a beginning of a contact, include media associated with the contact and video of the representative's display until a second event notification, e.g., corresponding to conclusion of the interactive session, and continue with only video of the representative's display until a third event notification, e.g., corresponding to a conclusion of all processing associated with the contact. As noted above, the third event notification may be generated or identified by a representative interaction requesting a new contact, or otherwise.

The sentiment component 410 can include functionality to determine details associated with an interactive contact session. For instance, the sentiment component 410 can include one or more trained models configured to determine customer sentiment, e.g., in real time or near real time. The sentiment component 410 can receive data, e.g., from the data feed component 404, about an in-process contact, and calculate a score or metric characterizing the customer's attitude or sentiment. Without limitation, the sentiment component 410 can process video, audio, text, or other types of content to determine the sentiment.

The data presentation component 412 is configured to cause data and information associated with the monitoring system 402 to be presented via the data administrator client device(s) 314. Without limitation, the data presentation component 412 can user interfaces for monitoring representative devices according to techniques described herein. For example, the data presentation component 412 can generate the graphical user interfaces 116, 202 illustrated and described above. With specific regard to the user interface 202, the data presentation component 412 can cause presentation of video associated with a data file generated by the data generation component 408, in the monitoring section 228 of the second window 206. The data presentation component 412 can also cause presentation of the content associated with the contact, e.g., via the multimedia player(s) 234.

Figure 5:
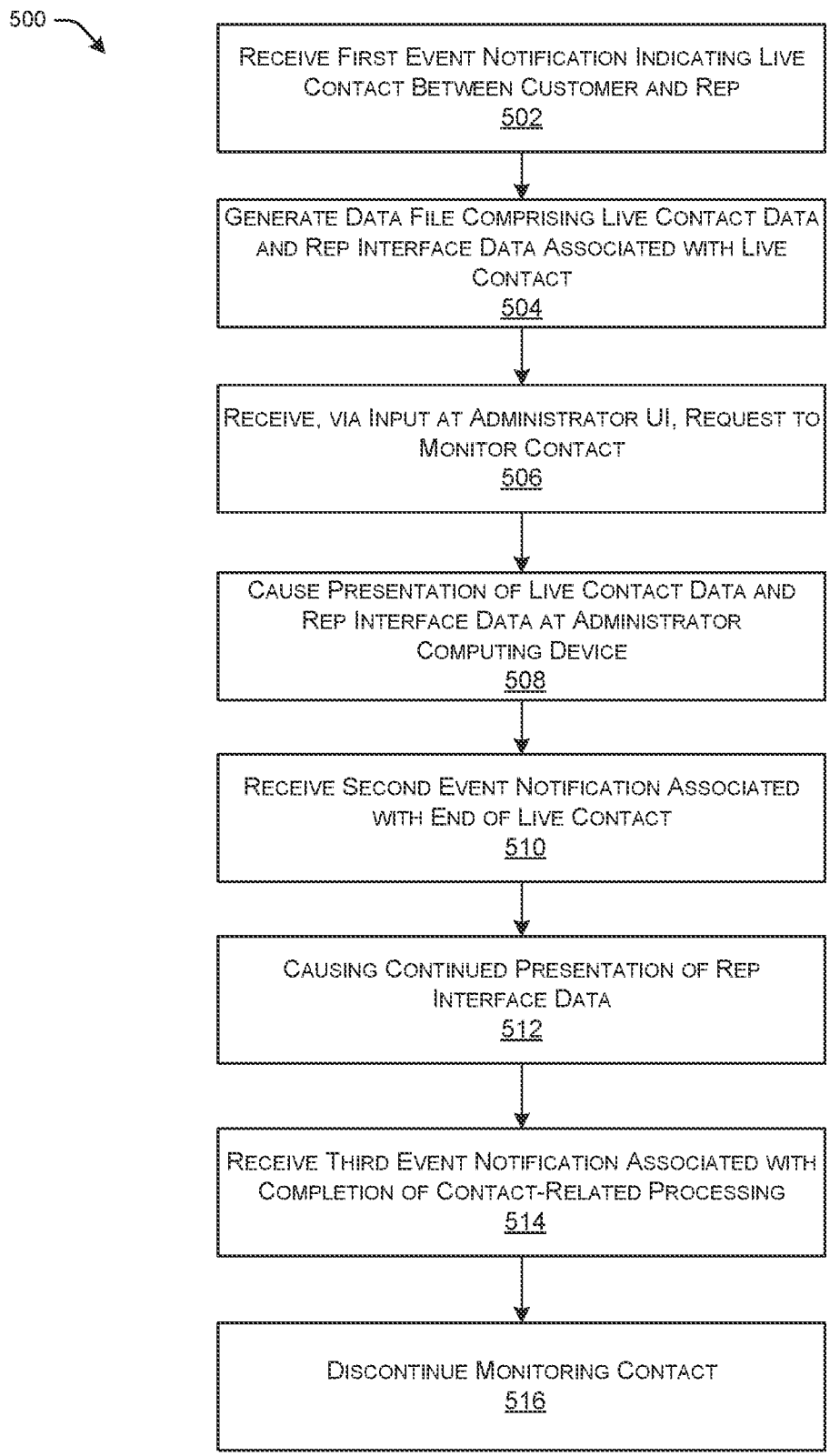
FIG. 5 is a flow diagram illustrating an example process for performing representative monitoring, in accordance with one or more examples of the present disclosure.

FIG. 5 is a flow diagram illustrating a process 500 of monitoring a representative client device according to aspects of this disclosure. Aspects of the process 700 may be implemented by the contact center server 102, the representative devices 104, the administrator device 106, and/or other aspects and components described herein. However, these specific devices are not limited to performing the process 700.

At an operation 502, the process 500 includes receiving a first event notification indicating a live contact between a customer device and a representative device. As detailed herein, a contact center computing architecture facilitates interactive communication sessions between representatives and customers. Without limitation, the operation 502 can include receiving a notification that a representative user has been assigned a contact, that a first interaction has been made between the representative and the customer to further the contact, or the like. The first event notification may be received from one or more of the representative devices 104, the contact center server 102, the external services 304 facilitating the communication session, the contact applications 126, and/or other components described herein or otherwise associated with commencing an interactive contact session.

At an operation 504, the process 500 includes generating a data file comprising live contact data and representative interface data associated with the live contact. For example, and as detailed herein, the interactive communication session can be a voice session, a chat session, an e-mail session, a text session, social media session, or the like and information about the session may be received at the data feed component 404. The data feed component 404 can also receive data corresponding to the display of the representative devices 104. The data file generated at the operation 704 can include both the interaction media data associated with the interaction and the video or display data associated with the communication session.

At an operation 506, the process 500 includes receiving, via an input at an administrator user interface, a request to monitor a contact. For example, FIG. 2 illustrates an example user interface 202 that includes selectable icons, e.g., the first icon 216. As described above, selection of the first icon 216 will generate a signal that the administrator is requesting to monitor the live contact. Although the example user interface 202 facilitates monitoring of only live contacts, in other examples a different user interface may allow a user to select stored data files, e.g., associated with already-completed interactive contact sessions. An administrator may select historical data to critique or review representatives, for training purposes, or other uses. Data files associated with customer interactions can be stored with searchable meta data, tags, hashes, or the like, so in some instances a user interface may allow an administrator to search for specific criteria to select an interaction to monitor or review.

At an operation 508, the process 500 includes causing presentation of the live contact data and the representative interface data at the administrator computing device. As noted above, aspects of this disclosure include presenting both the content of the interaction as well as data demonstrative of the representative's actions associated with the interaction. In examples, the former data may be any media used to facilitate the content or data generated from such media, e.g., a transcription of a speech-based interaction, and the latter may be a video of the representative's display. In the example discussed above in connection with FIG. 2, audio associated with a monitored contact may be presented via one of the multimedia player(s) 234 and the video of the representative's display can be presented in the monitoring section 228. The operation 508 can include transmitting the data file generated at the operation 504 to the administrator device, e.g., for playing by the administrator device, or causing data associated with the data file to be streamed or otherwise provided for display/presentation at the administrator device.

At an operation 510, the process 500 includes receiving a second event notification associated with the end of the live contact. In examples described herein, depending on the type of communication session, the communication session can end in a number of different ways. For instance, the customer or the representative may terminate a session by hanging up the phone, closing a browser, closing a window in a browser, logging out of a session, or the like. In the example of FIG. 4, the event identification component 406 can identify a conclusion of an interactive session.

At an operation 512, the process 500 includes causing a continued presentation of the representative interface data. In examples, although the interactive communication session has concluded, tasks associated with the session may still remain. For example, and without limitation, the representative may be required to perform post-processing including updating data records, generating notes or reminders, memorializing aspects of the contact session, or the like. By continuing to provide the video or other data associated with the representative display, the administrator can monitor the complete interaction, e.g., to oversee an entire workflow associated with the contact.

At an operation 514, the process 500 includes receiving a third event notification associated with completion of contact-related processing. In examples, the third event notification may be generated or detected based at least in part on the representative associated with the live contact indicating a readiness to receive a new contact or task. In other instances, the representative may indicate that they are going on break, performing non-contact related tasks and/or otherwise finished with the contact.

At an operation 516, the process 500 includes discontinuing monitoring the contact. As detailed herein, the data file may include data only from commencement of a contact to conclusion of processing associated with the contact. Thus, the third event notification corresponds to the end of the data file. Playback of the video corresponding to the representative's device may end and/or a notification may be provided to the administrator that the monitoring is concluded.

According to the foregoing, techniques descried herein provide for monitoring a contact between a representative and a customer in real-time and/or on-demand. Using the techniques detailed herein, data can be generated, transmitted, and processed in real-time in a contact center environment such that an administrator can monitor interactive contact sessions without being physically present with the representative. Moreover, the techniques described herein facilitate the retrieval of data associated with communication sessions, e.g., to review representative performance. Also in examples, data associated with specific interactions may be retrieved and presented as training interactions. Moreover, although techniques described herein generally relate to administrators monitoring representatives, because the contact center environments described herein facilitate transmission of data between and among a number of connected components, the data files can be accessed and used in other implementations. For example, live contacts can be monitored by other representatives, e.g., for training purposes. Moreover, stored data files associated with contacts can be accessed by other system users, e.g., representatives or other administrators.

Figure 6:
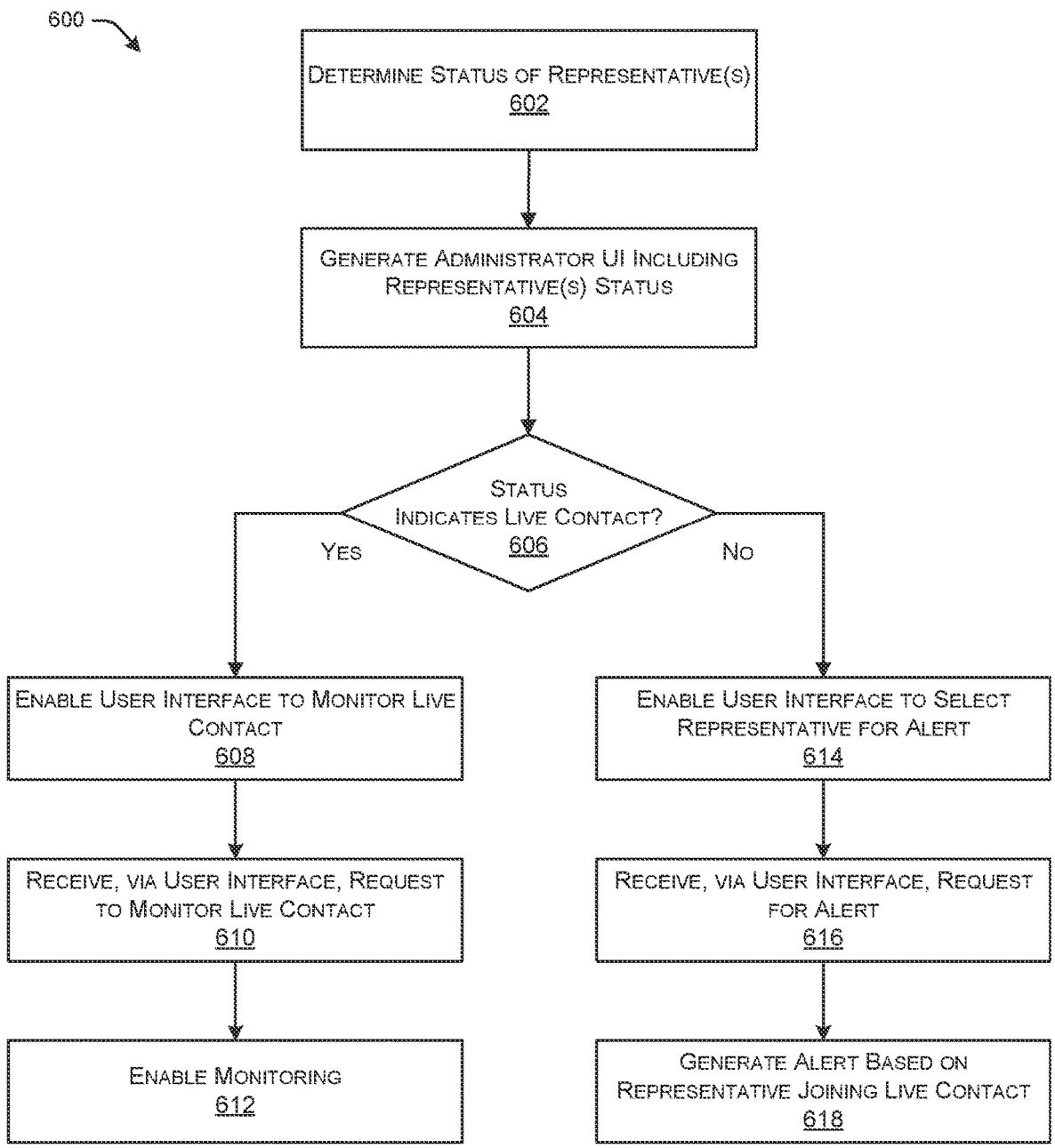
FIG. 6 is a flow diagram illustrating an example process for generating administrator user interfaces to facilitate representative monitoring, in accordance with one or more examples of the present disclosure.

FIG. 6 is a flow diagram illustrating an example process 600 of monitoring representatives in a contact center environment. The techniques and operations of the process 600 may be performed by various systems and components within the contact center computing environments 100, 200, and 300, such as the administrator device 106.

At an operation 602, the process 600 includes determining a status of one or more representatives. A contact center environment, such as the environment 100, can include a large number of representatives, e.g., up to thousands of representatives. Each of the representatives may login to or otherwise access an associated representative device. Based on actions taken relative to that device, a status of the representative may be determined. For instance, a representative may be actively communicating with or contacting a customer. Upon completion of the contact, the representative may be available to take another contact. Alternatively, the representative may be unavailable to take a contact, for instance, because the representative may be on break, performing other duties or tasks, or the like. In examples, status information can be received from each of the representative devices, from external sources, e.g., scheduling or task-assignment sources, or the like.

At an operation 604, the process 600 can include generating an administrator user interface including the representative status. FIG. 2 demonstrates an example user interface 202 that includes representatives, e.g., in the first column 208, and a status associated with each, e.g., in the second column 210. In this example, the first window 204 of the user interface 202 also provides additional information about the representatives.

At an operation 606, the process 600 includes determining whether the status indicates a live contact. For example, the operation 606 may determine whether individual representatives are assisting a customer, e.g., via an interactive session. The operation 606 may also determine a representative is on a live contact when the representative has concluded an interaction but has not yet indicated they are available to receive a new contact. As described herein, a contact or communication session can include not only the interaction with the customer, but pre- and/or post-processing associated with that interaction.

If, at the operation 606 it is determined that a representative is on a live contact, at an operation 608 the process 600 includes enabling a user interface to monitor the live contact. FIG. 2 illustrates the graphical user interface 202 as including the first icon 216 indicating that the representative "Mike D." can be monitored. Of course, the graphical user interface 202 is for example only; other user interfaces could enable selection of a representative to monitor.

At an operation 610, the process 600 includes receiving, via the user interface, a request to monitor the live contact. In the example illustrated in FIG. 2, the administrator may interface with the user interface 202 by selecting the first icon 216 to indicate a desire to monitor the representative "Mike D." In examples, the user interface may provide other functionality or features for indicating a desire to monitor a representative.

At an operation 612, the process 600 includes enabling monitoring. For example, the operation 612 can include causing media associated with the live contact and video associated with the representatives display to be presented to the administrator, e.g., as in second window 206 of the user interface 202. Although not shown in FIG. 6, the process 600 can also include displaying the second icon 216 in connection with monitored representative and/or otherwise indicating that the representative is being monitored.

If, at the operation 606 it is determined that a representative is not on a live contact, at an operation 614 the process 600 can include enabling a user interface to select a representative for an alert. FIG. 2 illustrates the graphical user interface 202 as including the first alert icon 222 in the fifth column 220 indicating that an alert may be set in connection with the representative "Chris P." As detailed above, the first alert icon may be toggled, e.g., with the second alert icon 224, between a first state in which monitoring is not desired, and a second state associated with alerting the administrator when the representative is available for monitoring, e.g., on a live contact, Of course, the graphical user interface 202 is for example only; other user interfaces could enable selection of a representative to monitor.

At an operation 616, the process 600 includes receiving, via the user interface, a request for an alert. In the example illustrated in FIG. 2, the administrator may interface with the user interface 202 by selecting the first alert icon 222, to indicate a desire to receive an alert when the representative "Chris P." is on a live contact or otherwise available for monitoring. In examples, the user interface may provide other functionality or features for indicating a desire to receive an alert associated with a representative.

At an operation 618, the process 600 includes generating an alert based on a representative joining a live contact. For example, the operation 618 can include causing an e-mail, text message, audio alert, visual indication, or the like to be presented to the administrator when a representative for which an alert is desired is available for monitoring. Although not shown in FIG. 6, the process 600 can also include displaying the second alert icon 216 in connection with a representative for whom an alert has been enabled.

Thus, the process 600 is an example process for monitoring representatives and/or for managing monitoring representatives in a contact center environment. The techniques described herein may allow an administrator to selectively monitor representatives, regardless of proximity to those representatives. The techniques also allow administrators to receive alerts associated with monitoring availability, rather than requiring the administrator to actively monitor a representative status to determine whether and when the representative can be monitored. Moreover, according to techniques described herein the administrator may be able to monitor representatives in a manner that is non-obtrusive and/or invisible to the representatives and customers, thereby enhancing representative reviewing and training, improving customer outcomes, and/or enhancing efficiency in the contact center environment.

Figure 7:
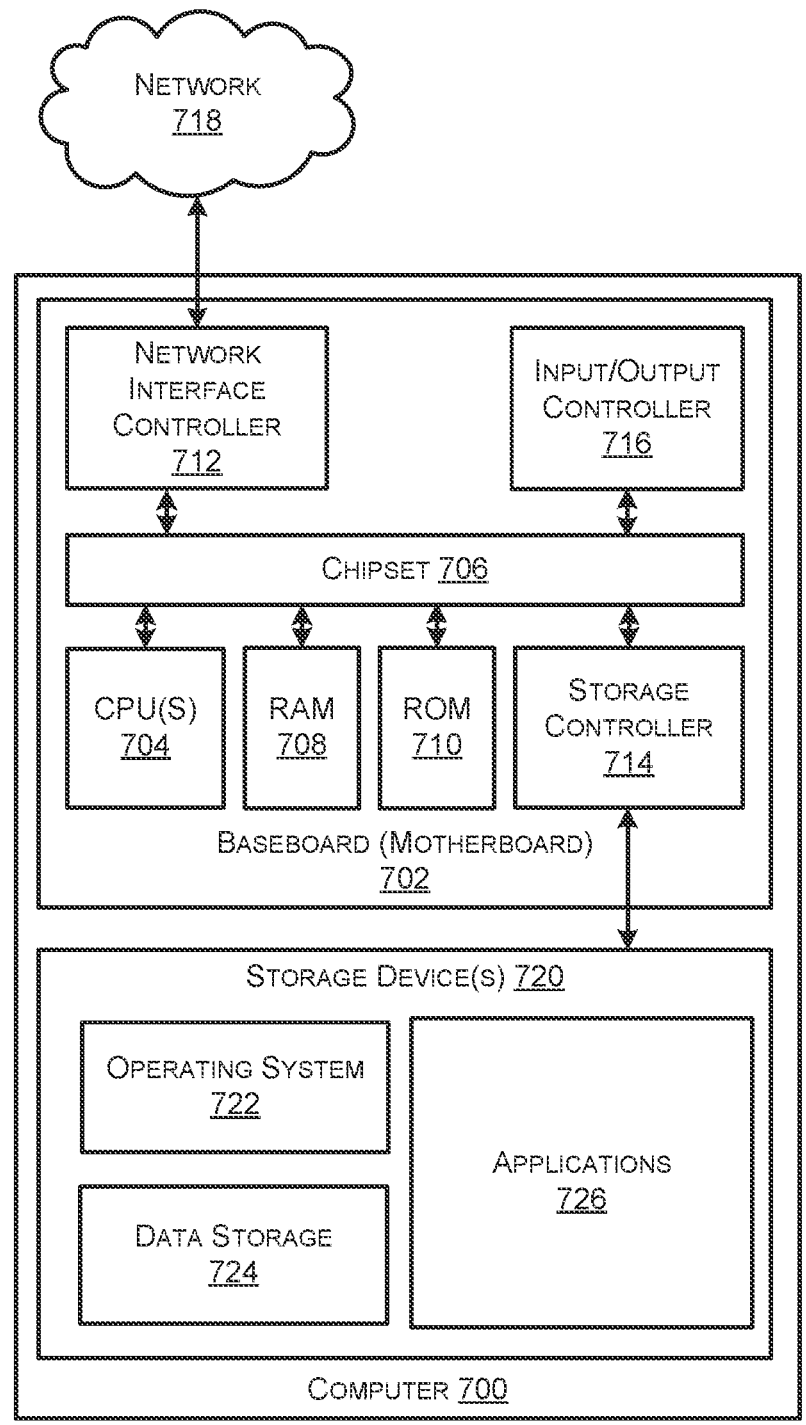
FIG. 7 is an example architecture for a computing device capable of executing program components for implementing various techniques described herein.

FIG. 7 shows an example computer architecture for a computing system 700 capable of executing program components for implementing the functionality described herein. The computer architecture shown in FIG. 7 may correspond to the systems and components of a server computer, workstation, desktop computer, laptop, tablet, network appliance, mobile device (e.g., tablet computer, smartphone, etc.), or other computing device, and can execute any of the software components described herein. The computing system 700 may, in some examples, correspond to any of the computing systems or devices described above, such as the representative client devices 104, the administrator device 106, the operational system(s) 316, and/or any other computing devices described herein. It will be appreciated that in various examples described herein, a computing system 700 might not include all of the components shown in FIG. 7, can include additional components that are not explicitly shown in FIG. 7, and/or may utilize a different architecture from that shown in FIG. 7.

The computing system 700 includes a baseboard 702, or "motherboard," which may be a printed circuit board to which a multitude of components or devices are connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computing system 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computing system 700. The chipset 706 can further provide an interface to a computer-readable storage medium such as a ROM 710 or non-volatile RAM ("NVRAM") for storing basic routines that help to startup the computing system 700 and to transfer information between the various components and devices. The ROM 710 or NVRAM can also store other software components necessary for the operation of the computing system 700 in accordance with the configurations described herein.

The computing system 700 can operate in a networked environment using logical connections to remote computing devices and computer systems through a network, such as the network 718, which may be similar or identical to network 308 discussed above. The chipset 706 also may include functionality for providing network connectivity through a Network Interface Controller (NIC) 712, such as a gigabit Ethernet adapter. The NIC 712 is capable of connecting the computing system 700 to other computing devices over the network 718. It should be appreciated that multiple NICs 712 can be present in the computing system 700, connecting the computer to other types of networks and remote computer systems. In some instances, the NICs 712 may include at least on ingress port and/or at least one egress port.

The computing system 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device.

The computing system 700 can include one or more storage device(s) 720, which may be connected to and/or integrated within the computing system 700, that provide non-volatile storage for the computing system 700. The storage device(s) 720 can store an operating system 722, data storage systems 724, and/or applications 726, which are described in more detail herein. The storage device(s) 720 can be connected to the computing system 700 through a storage controller 714 connected to the chipset 706. The storage device(s) 720 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing system 700 can store data on the storage device(s) 720 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device(s) 720 are characterized as primary or secondary storage, and the like.

For example, the computing system 700 can store information to the storage device(s) 720 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing system 700 can further read information from the storage device(s) 720 by detecting the physical states or characteristics of one or more particular locations within the physical storage units.

In addition to the storage device(s) 720 described above, the computing system 700 can have access to other computer-readable storage media to store and retrieve information, such as program modules, data structures, or other data.

It should be appreciated by those skilled in the art that computer-readable storage media is any available media that provides for the non-transitory storage of data and that can be accessed by the computing system 700. In some examples, the various operations performed by a computing system (e.g., client devices, internal servers, etc.) may be supported by one or more devices similar to computing system 700. Stated otherwise, some or all of the operations described herein may be performed by one or more computers 700 operating in a networked (e.g., client-server or cloud-based) arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device(s) 720 can store an operating system 722 utilized to control the operation of the computing system 700. In some examples, the operating system 722 comprises a LINUX operating system. In other examples, the operating system 722 comprises a WINDOWS® SERVER operating system from MICROSOFT Corporation of Redmond, Washington. In further examples, the operating system 722 can comprise a UNIX operating system or one of its variants. It should be appreciated that other operating systems can also be utilized. The storage device(s) 720 can store other system or application programs and data utilized by the computing system 700.

In various examples, the storage device(s) 720 or other computer-readable storage media is encoded with computer-executable instructions which, when loaded into the computing system 700, transform the computer from a general-purpose computing system into a special-purpose computer capable of implementing various techniques described herein. These computer-executable instructions transform the computing system 700 by specifying how the CPUs 704 transition between states, as described above. In some examples, the computing system 700 may have access to computer-readable storage media storing computer-executable instructions which, when executed by the computing system 700, perform the various techniques described herein. The computing system 700 can also include computer-readable storage media having instructions stored thereupon for performing any of the other computer-implemented operations described herein.

As illustrated in FIG. 7, the storage device(s) 720 may store one or more data storage systems 724 configured to store data structures and other data objects. Additionally, the software applications 726 stored on the computing system 700 may include one or more client applications, services, and/or other software components. For example, for one of the representative client device(s) 312, application(s) 726 may include instances of the contact application 126, the desktop application 124, or other software components described herein.

In accordance with the foregoing, aspects of this disclosure describe data generation and dissemination in a contact center environment. Aspects of the environment include functionality for providing users of the system with up-to-date information, e.g., in real-time. For instance, representatives using a contact center environment to respond to customer queries may benefit from the processes described herein by receiving important information during communication sessions. Using the thick-client client devices may promote more robust data generation and transmission at the representative device and may facilitate display of timely information at the representative client device.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A contact center server, comprising:
   one or more processors; and
   one or more non-transitory computer-readable media storing computer-executable instructions that, when executed, cause the one or more processors to perform operations comprising:
   receiving an event notification associated with a live interaction between a representative computing device and a user computing device;
   receiving, from an administrator computing device, a request to monitor the live interaction; and
   causing, in response to the request from the administrator computing device, (i) presentation of a user interface on the administrator computing device, the user interface including a first display window corresponding to at least a portion of a second display window of the representative computing device, and (ii) presentation, on the administrator computing device, of data associated with the live interaction.

2. The contact center server of claim 1, the operations further comprising:

receiving a second event notification indicating that the live interaction has ended; and based at least in part on the second event notification, discontinuing the presentation of the data associated with the live interaction on the administrator computing device.

3. The contact center server of claim 2, the operations further comprising:

continuing, after receiving the second event notification, the presentation of the user interface on the administrator computing device;

receiving a third event notification, generated by the representative computing device, indicating that a representative has completed one or more tasks associated with the live interaction; and based at least in part on the third event notification, discontinuing the presentation of the user interface on the administrator computing device.

4. The contact center server of claim 1, the operations further comprising:

determining a sentiment score associated with the live interaction; and presenting, via the user interface, a representation of the sentiment score.

5. The contact center server of claim 4, wherein the determining the sentiment score comprises:

generating textual data based at least in part on audio associated with the live interaction; and providing the textual data to a machine-learned model configured to output the sentiment score.

6. The contact center server of claim 1, the operations further comprising:

generating a data file comprising a video of the second display window of the representative computing device, and audio associated with the live interaction;

associating an identifier of the live interaction with the data file; and storing the data file with the identifier.

7. The contact center server of claim 1, the operations further comprising:

receiving, via the administrator computing device, an identification of a representative;

determining that the representative is associated with the representative computing device;

generating an alert, based at least in part on determining that the event notification is associated with the representative, an alert; and causing, in response to the alert, a notification on the administrator computing device indicating the live interaction.

8. The contact center server of claim 1, the operations further comprising:

receiving, via the user interface, an input comprising a request to transmit data to the representative computing device; and causing display of the data on the second display window of the representative computing device.

9. The contact center server of claim 8, wherein at least one of:

the data comprises at least one of a textual instruction, a link, or a document; or the data is displayed on the second display window of the representative computing device during the duration of the live interaction.

10. A method comprising:

receiving an indication of a live contact between a first computing device of a representative and a second computing device of a user;

receiving, from a third computing device, a request to monitor the live contact; and causing, at the third computing device and based at least in part on the request, (i) presentation of data associated with the live contact and (ii) presentation of a display window corresponding to at least a portion of a display of the first computing device.

11. The method of claim 10, wherein the causing the presentation of the data associated with the live contact comprises causing presentation of at least one of audio or video communication between the first computing device and the second computing device.

12. The method of claim 10, further comprising:

determining, based at least in part on the data associated with the live contact, a sentiment score associated with the live contact, wherein the data associated with the live contact includes a representation of the sentiment score.

13. The method of claim 10, further comprising:

receiving a second indication indicating a conclusion of the live contact; and based at least in part on the second indication, discontinuing presentation of the data associated with the live contact.

14. The method of claim 13, further comprising:

continuing, after receiving the second indication, the presentation of the display window corresponding to the display of the first computing device;

receiving, during continued presentation of the display, a third indication indicating at least one of: completion of one or more tasks associated with the live contact or a state of the first computing device associated with availability to commence an additional live contact; and based at least in part on the third indication, discontinuing the presentation of the display.

15. The method of claim 10, further comprising:

receiving, from the third computing device and during the live contact, a request to transmit data to the first computing device; and causing display of the data on the display of the first computing device.

16. The method of claim 10, further comprising:

receiving, from the third computing device, an identification of a representative;

determining that the representative is associated with the first computing device;

generating an alert, based at least in part on the determining that the indication of the live contact is associated with the representative; and causing, at least in part in response to the alert, a notification on the third computing device indicating the live contact.

17. One or more non-transitory computer-readable media storing instructions that, when executed by one or more processors, cause the one or more processors to perform operations comprising:

causing an interactive session to commence between a representative computing device and a remote computing device;

receiving, at an administrator computing device, an indication of a commencement of the interactive session;

receiving, in response to a user input received via a user interface of the administrator computing device, a request to monitor the interactive session; and causing, at the administrator computing device and based at least in part on the request, (i) presentation of data associated with the interactive session, and (ii) presentation of a first display window corresponding to a second display window of the representative computing device.

18. The one or more non-transitory computer-readable media of claim 17, the operations further comprising:

receiving a second indication indicating a conclusion of the interactive session; and based at least in part on the second indication, discontinuing presentation of the data associated with the interactive session via the administrator computing device.

19. The one or more non-transitory computer-readable media of claim 18, the operations further comprising:

continuing, after receiving the second indication, the presentation of the first display window corresponding to the second display window of the representative computing device;

receiving, during continued presentation of the first display window, a third indication indicating at least one of completion of one or more tasks associated with the interactive session or a state of the representative computing device associated with availability to commence an additional interactive session; and based at least in part on the third indication, discontinuing the presentation of the first display window on the administrator computing device.

20. The one or more non-transitory computer-readable media of claim 17, the operations further comprising:

receiving, from the administrator computing device, an identification of a user;

generating an alert, based at least in part on determining that the indication is associated with the user; and causing, at least in part in response to the alert, a notification on the administrator computing device indicating the interactive session.

\* \* \* \* \*